US012783391B2

(12) United States Patent
Ojha et al.

(10) Patent No.: US 12,783,391 B2
(45) **Date of Patent: *Nov. 3, 2026**

(54) SOFTWARE DEVELOPMENT EFFICIENCY IMPROVEMENT ENGINE

(71) Applicant: SAP SE, Walldorf (DE)

(72) Inventors: Rupam Ojha, Benares (IN); Priyanka Aggarwal, Rohini (IN); Apurba Ghosh, Bangalore (IN); Srinivasan Ramanathan, Bangalore (IN); Nirmala Shettar, Bangalore (IN); Inayath Mohamed, Bangalore (IN)

(73) Assignee: SAP SE, Walldorf (DE)

( * ) Notice: Subject to any disclaimer, the term of this patent is extended or adjusted under 35 U.S.C. 154(b) by 295 days.

This patent is subject to a terminal disclaimer.

(21) Appl. No.: 18/781,782

(22) Filed: Jul. 23, 2024

(65) Prior Publication Data

US 2026/0030142 A1 Jan. 29, 2026

(51) Int. Cl.

| | |
|---|---|
| ***G06F 11/3668*** | (2025.01) |
| ***G06F 8/41*** | (2018.01) |
| ***G06F 8/77*** | (2018.01) |

(52) U.S. Cl.

CPC .......... *G06F 11/3684* (2013.01); *G06F 8/433* (2013.01); *G06F 8/77* (2013.01)

(58) Field of Classification Search

CPC ............................. G06F 11/3684; G06F 8/433

See application file for complete search history.

(56) References Cited

U.S. PATENT DOCUMENTS

| | | | | |
|---|---|---|---|---|
| 12,645,435 | B2 * | 6/2026 | Savalle | G06F 8/35 |
| 12,675,630 | B2 * | 7/2026 | Beauchamp | G06F 40/166 |
| 2024/0256423 | A1 * | 8/2024 | Zhang | G06F 11/3608 |
| 2024/0330167 | A1 * | 10/2024 | Duong | G06F 11/3684 |
| 2024/0338184 | A1 * | 10/2024 | Bendert | G06F 8/433 |
| 2024/0338310 | A1 * | 10/2024 | Bendert | G06F 11/3688 |
| 2024/0403198 | A1 * | 12/2024 | Chandel | G06F 11/3604 |
| 2024/0427566 | A1 * | 12/2024 | Lin | G06F 11/3688 |
| 2025/0077396 | A1 * | 3/2025 | Sen | G06F 11/3684 |
| 2025/0077397 | A1 * | 3/2025 | Sen | G06F 11/3684 |
| 2025/0077399 | A1 * | 3/2025 | Sen | G06F 11/328 |

(Continued)

FOREIGN PATENT DOCUMENTS

| | | | | |
|---|---|---|---|---|
| CN | 117632710 A | * | 3/2024 | G06F 8/31 |
| CN | 118779213 A | * | 10/2024 | G06N 3/08 |

(Continued)

*Primary Examiner* — Francisco J Aponte

(74) *Attorney, Agent, or Firm* — SCHWEGMAN LUNDBERG & WOESSNER, P.A.

(57) ABSTRACT

In a first use case, a description of source code to be created is validated and used to form a prompt for a large language model (LLM). The prompt is provided to the LLM to generate an output. The output from the LLM is post-processed to generate the source code. In a second use case, a source code file is processed and provided, along with instructions, to an LLM. The LLM provides a list of the methods in the source code file. The LLM is requested to provide a unit test for each of the listed methods. The output from the LLM is post-processed to generate unit tests for the methods in the identified source code file. In a third use case, the LLM is used to generate unit tests for new methods added to the source code file after unit tests were generated.

20 Claims, 11 Drawing Sheets

(56) References Cited

U.S. PATENT DOCUMENTS

| | | | | |
|---|---|---|---|---|
| 2025/0077682 | A1* | 3/2025 | Guttridge | G06F 11/3684 |
| 2025/0094138 | A1* | 3/2025 | Hu | G06F 40/226 |
| 2025/0265179 | A1* | 8/2025 | Kanagovi | G06F 11/3684 |
| 2025/0291583 | A1* | 9/2025 | Agarwal | G06F 8/30 |
| 2025/0342017 | A1* | 11/2025 | Morales | G06F 8/51 |

FOREIGN PATENT DOCUMENTS

| | | | | | |
|---|---|---|---|---|---|
| CN | 119046134 | A | * | 11/2024 | G06F 8/43 |
| JP | 2012084131 | A | * | 4/2012 | G06F 11/3672 |

* cited by examiner

SOFTWARE DEVELOPMENT EFFICIENCY IMPROVEMENT ENGINE

TECHNICAL FIELD

The subject matter disclosed herein generally relates to improving software development efficiency, and more specifically, to systems utilizing large language models (LLMs) to improve software development efficiency.

BACKGROUND

Software development is a time-consuming process, even for relatively routine tasks. LLMs such as ChatGPT provide a natural-language interface that has promise for assisting in application development, but, by default, has limited utility. Using LLMs for software development is, itself, a skill that requires practice and time.

DETAILED DESCRIPTION

Example methods and systems are directed to improving software development efficiency using a software development efficiency improvement engine. The software development efficiency improvement engine has multiple use cases.

In a first use case, a software developer provides a description of source code to be created. The description is validated and used to form a prompt for an LLM. The prompt is provided to the LLM to generate an output. The output from the LLM is validated and otherwise post-processed to generate the source code.

In a second use case, a software developer identifies a source code file containing one or more methods. As used herein, the terms method and function, in the context of computer programming elements, are used interchangeably. The source code file is processed and provided, along with instructions, to an LLM. The LLM provides a list of the methods in the source code file. The LLM is requested to provide a unit test for each of the listed methods. The output from the LLM is validated and otherwise post-processed to generate unit tests for the methods in the identified source code file.

In a third use case, the software developer identifies a source code file containing one or more methods that already have unit tests. A modified version of the process for the second use case is used to generate unit tests for the one or more methods where the unit test is already available, and the source code is modified.

Using the systems and methods described herein, substantial development efforts are reduced as compared to manual software development. Additionally, the resulting quality of code generated from the LLM is substantially improved over ordinary natural-language interaction by software developers.

Figure 1:
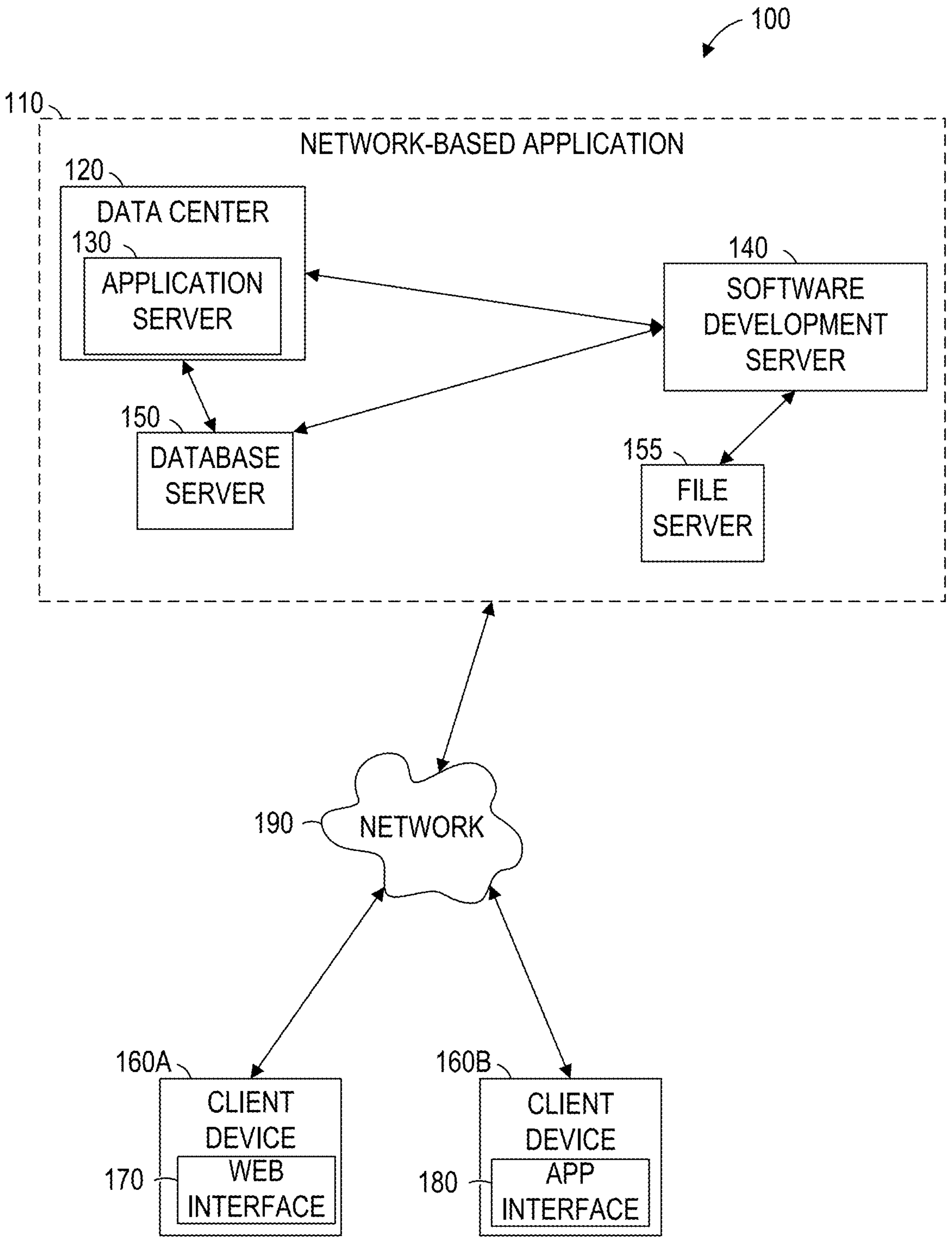
FIG. 1 shows a network diagram illustrating an example network environment suitable for providing a software development efficiency improvement engine.

FIG. 1 shows a network diagram illustrating an example network environment 100 suitable for providing a software development efficiency improvement engine. The network environment 100 includes a network-based application 110, client devices 160A and 160B, and a network 190. The network-based application 110 is implemented at a data center 120 comprising an application server 130 in communication with a database server 150. A software development server 140 may be accessed by users of the client devices 160A-160B to develop software that is deployed to the application server 130. Source code files used by the software development server 140 may be stored at the file server 155. In some example embodiments, the software development server 140, the file server 155, or both, are part of the data center 120.

An application executing on the application server 130 may access data from the database server 150. The letter suffixes of reference numbers may be omitted when doing so does not raise ambiguity. For example, the client devices 160A-160B may be referred to collectively as "client devices 160." Similarly, when the specific one of the client devices 160A-160B is not of particular import, "client device 160" may be referenced.

The software development server 140 may include (or access) a software development efficiency improvement engine that uses an LLM to generate application code or unit tests. The application running on the application server 130 may provide services to the client devices 160A and 160B. For example, a user of the client device 160A may be an employee of a business using a business application. The user may use the services to generate invoices, manage employees, develop other applications, or any suitable combination thereof. The UI for the application may be presented using a web interface 170 or an app interface 180.

The application server 130, the software development server 140, the database server 150, the file server 155, and the client devices 160A-160B may each be implemented in a computer system, in whole or in part, as described below with respect to FIG. 11. Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 130, the software development server 140, the database server 150, the file server 155, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Though FIG. 1 shows only one or two of each element (e.g., one software development server 140, one application server 130, two client devices 160A and 160B, and the like), any number of each element is contemplated. For example, the application server 130 may be one of dozens or hundreds of active and standby servers and provide services to millions of client devices. Likewise, the software development server 140 may be accessed by dozens, hundreds, or thousands of software developers with client devices 160, be used by many application servers 130, and so on.

Figure 2:
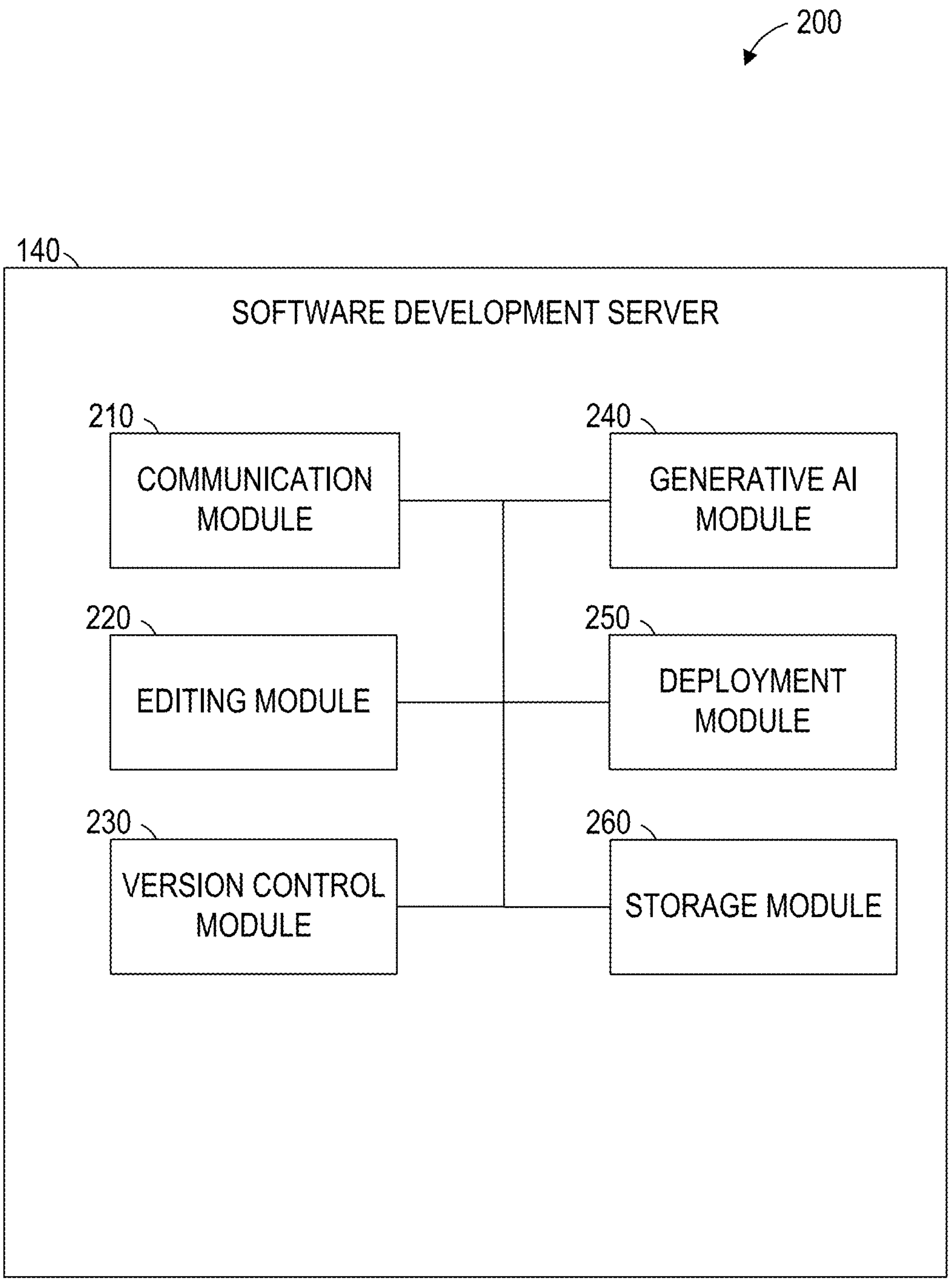
FIG. 2 shows a block diagram of a software development server, suitable for providing a software development efficiency improvement engine.

FIG. 2 shows a block diagram 200 of the software development server 140, suitable for providing a software development efficiency improvement engine. The software development server 140 is shown as including a communication module 210, an editing module 220, a version control module 230, a generative artificial intelligence (AI) module 240, a deployment module 250, and a storage module 260, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the software development server 140 and transmits data from the software development server 140. For example, the communication module 210 may receive, from the client device 160A, a request to generate source code in response to user input. In response, the communication module 210 provides the user input to the generative AI module 240. The communication module 210 may also send compiled software to the application server 130 or receive source code files from the file server 155.

The editing module 220 receives revisions from software developers and applies the revisions to source code files. The version control module 230 maintains multiple versions of source code files. Retaining multiple versions aids in debugging software by allowing the performance of the different versions to be compared. When a bug appears in a certain version and not in the previous version, it is likely that the cause of the bug is in the changes that were made in the buggy version.

The generative AI module 240 includes an LLM that generates source code in response to a prompt. The LLM may be trained by providing a training set of prompts and source code responses. Alternatively, using well-constructed prompts, a general-purpose LLM may provide high quality results without specialized training.

Completed software may be deployed to the application server 130 by the deployment module 250. For example, a software developer may modify code and submit the modified code to unit tests. After the unit tests complete successfully, the deployment module 250 moves the modified code from development to production by copying compiled source code to the application server 130. The deployed production application is accessible to end-users.

Data, metadata, documents, instructions, or any suitable combination thereof may be stored and accessed by the storage module 260. For example, local storage of the software development server 140, such as a hard drive, may be used. As another example, network storage may be accessed by the storage module 260 via the network 190.

Figure 3:
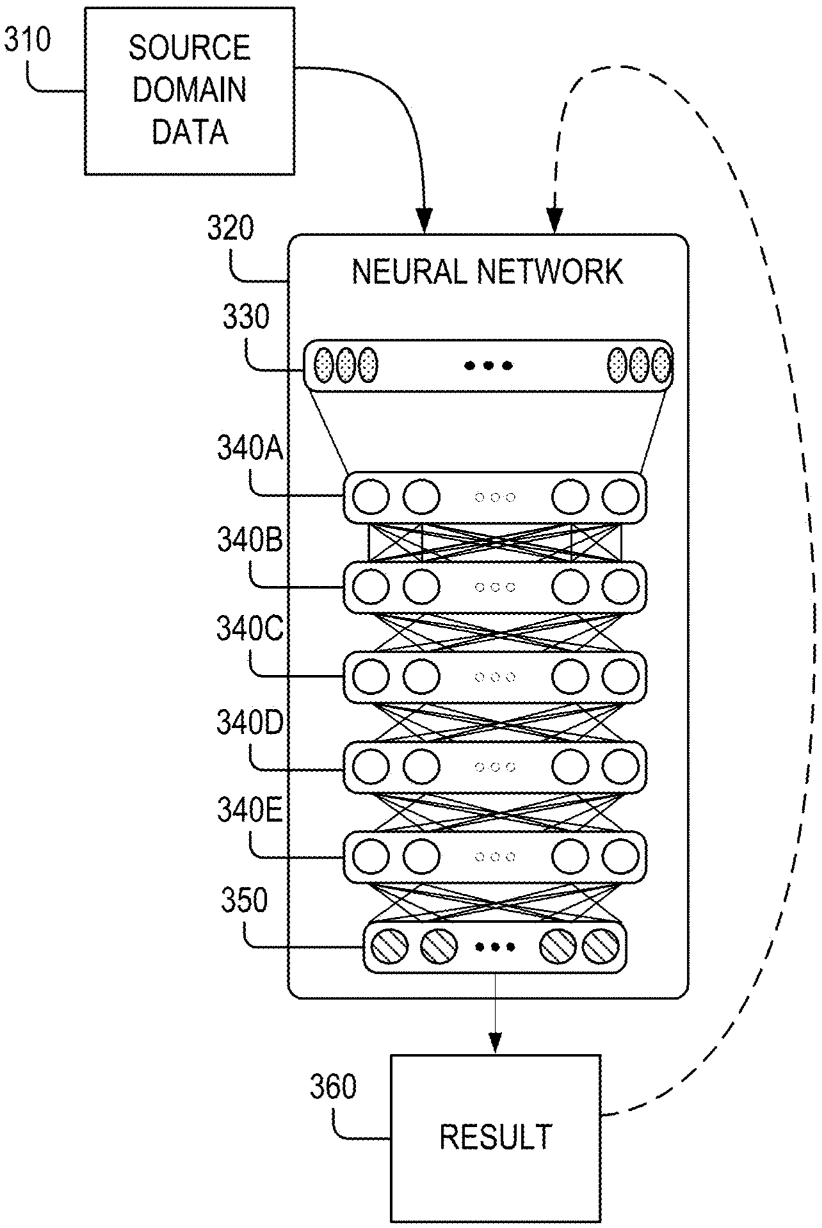
FIG. 3 is a block diagram of a neural network, suitable for use as a machine learning model for software development, according to some example embodiments.

FIG. 3 is a block diagram of a neural network 320, suitable for use as a machine learning model for software development, according to some example embodiments. The neural network 320 takes source domain data 310 as input and processes the source domain data 310 using an input layer 330; intermediate, hidden layers 340A, 340B, 340C, 340D, and 340E; and output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from the source domain data 310. The output of the output layer 350 is the result 360. The intermediate layers 340A-340E are referred to as "hidden" because they do not interact directly with either the input or the output and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. In some example embodiments, the number of epochs is 10, 100, 500, or 1000. Within an epoch, one or more batches of the training dataset are used to train the model. Thus, the batch size ranges between one and the size of the training dataset, and the number of epochs is any positive integer value. The model parameters are updated after each batch (e.g., using gradient descent).

For self-supervised learning, the training dataset comprises self-labeled input examples. For example, a set of color images could be automatically converted to black-and-white images. Each color image may be used as a "label" for the corresponding black-and-white image and used to train a model that colorizes black-and-white images. This process is self-supervised because no additional information, outside of the original images, is used to generate the training dataset. Similarly, when text is provided by a user, one word in a sentence can be masked and the network trained to predict the masked word based on the remaining words.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model, satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs-having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusters is used to select a model that produces the clearest bounds for its clusters of data.

The neural network 320 may be a deep learning neural network, a deep convolutional neural network (CNN), a recurrent neural network (RNN), a transformer neural network, or another type of neural network. A neuron is an architectural element used in data processing and artificial intelligence, particularly machine learning. A neuron implements a transfer function by which a number of inputs are used to generate an output. In some example embodiments, the inputs are weighted and summed, with the result compared to a threshold to determine if the neuron should generate an output signal (e.g., a 1) or not (e.g., a 0 output). The inputs of the component neurons are modified through the training of a neural network. One of skill in the art will appreciate that neurons and neural networks may be constructed programmatically (e.g., via software instructions) or via specialized hardware linking each neuron to form the neural network.

An example type of layer in the neural network 320 is a Long Short Term Memory (LSTM) layer. An LSTM layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input. Thus, the coefficients assign significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight updates. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value, which roughly represents its contribution to the original output. Backpropagation can use these error values to calculate the gradient of the cost function with respect to the weights in the neural network. The calculated gradient is fed to the selected optimization method to update the weights to attempt to minimize the cost function.

In some example embodiments, the structure of each layer is predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, DNNs, genetic or evolutionary algorithms, and the like. With the help of natural language processing (NLP) and advanced data pre-processing, a machine learning model (e.g., the neural network 320) can be trained on historical (existing) data (for instance, resource usage data) from the system to predict future data.

The transformer architecture processes an entire input at once rather than sequentially. For example, a recurrent neural network processes words or sentences sequentially, with the output of the RNN treated as an input for each input after the first (thus the use of the word "recurrent" in the name). As a result, relationships between elements that are far apart in the input are difficult to detect. The transformer architecture receives a larger input and learns the interrelationships between the elements and the output using an attention mechanism. Since all elements are processed together, distance between the elements of the input does not affect the learning process. The output may still be generated sequentially, with the previous result (e.g., word for an LLM, pixel for an image-generating AI, and the like) being provided as an input for determination of the next result.

Figure 4:
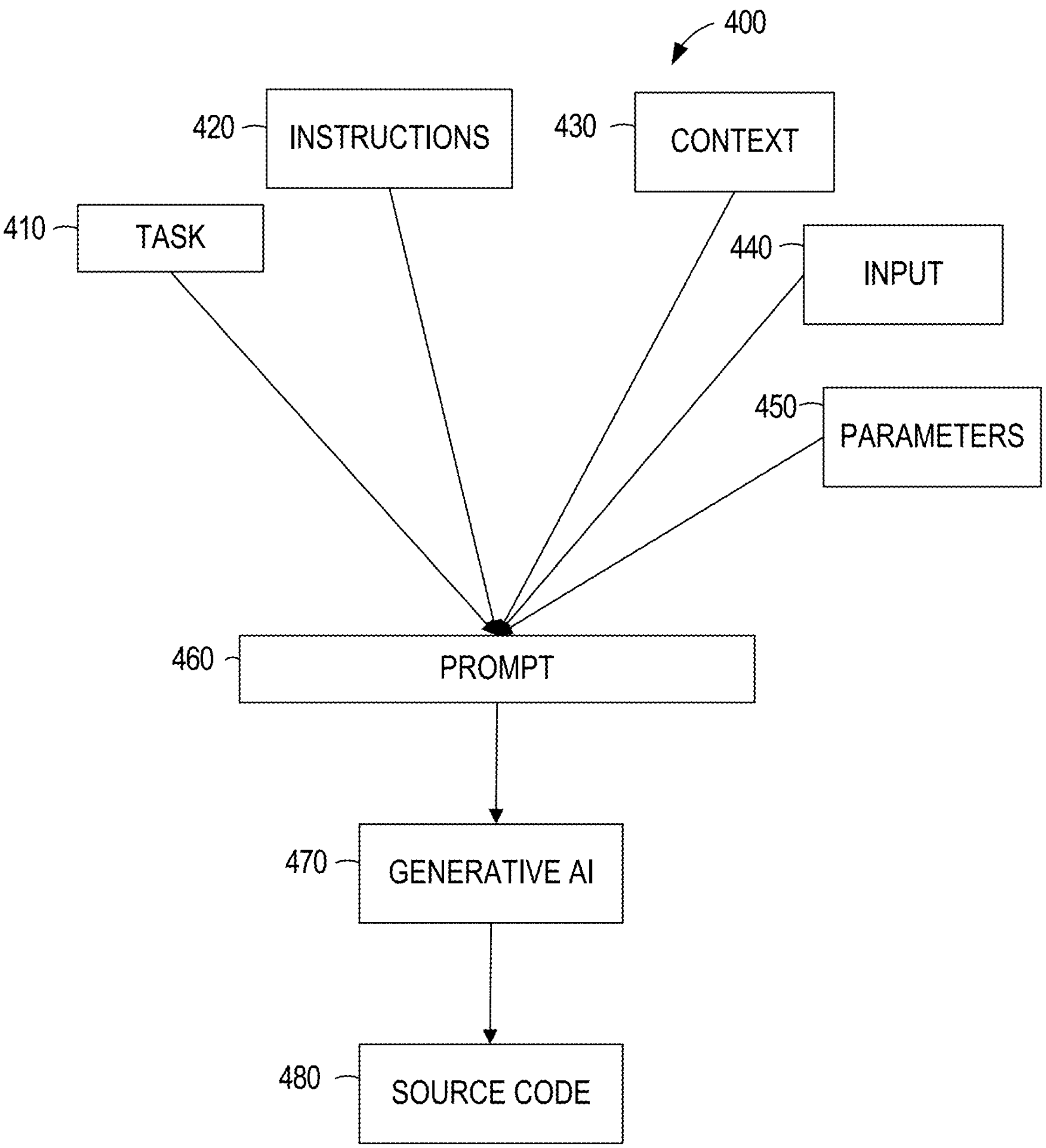
FIG. 4 illustrates a data flow for a software development efficiency improvement engine, according to some example embodiments.

FIG. 4 illustrates a data flow 400 for a software development efficiency improvement engine, according to some example embodiments. A task 410, instructions 420, context 430, input 440, and parameters 450 are used to generate a prompt 460. The prompt 460 is provided to a generative AI 470. In response to the prompt 460, the generative AI 470 generates source code 480.

The task 410 may indicate whether the generative AI 470 is to generate source code to perform a function, source code for unit testing of all functions in a file, or source code for unit testing of a subset of functions in a file. The instructions 420 may include an output format, an output structure, do's and don'ts, ideas, examples, or any suitable combination thereof. The context 430 may identify a target audience, a perspective, a purpose, or any suitable combination thereof. The input 440 may include a text description of source code to be generated, source code for which unit tests are to be generated, or both. The parameters 450 may identify a length, a temperature, a model, a penalty, or any suitable combination thereof. In some example embodiments, the task 410, the context 430, the input 440, or any suitable combination thereof, are received from a software developer. In some example embodiments, the instructions 420, the context 430, the parameters 450, or any suitable combination thereof are determined by the software development server 140 regardless of the input received from the software developer.

Figure 5:
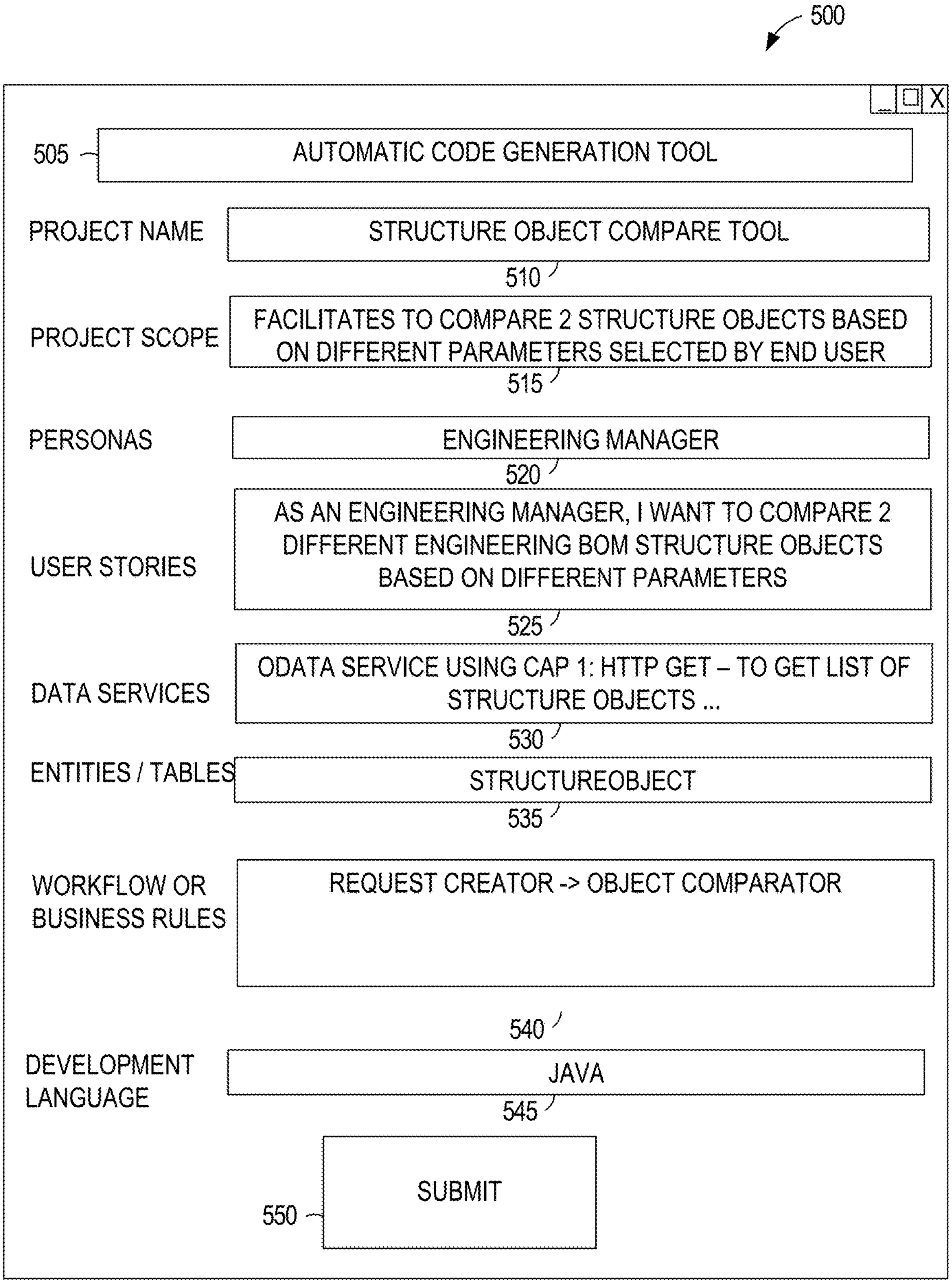
FIG. 5 shows an illustration of a user interface (UI) suitable for automatic code generation using a software development efficiency engine, according to some example embodiments.

FIG. 5 shows an illustration of a UI 500 suitable for automatic code generation using a software development efficiency engine, according to some example embodiments. The UI 500 includes a title 505, input fields 510, 515, 520, 525, 530, 535, 540, and 545, and a button 550. The UI 500 may be presented on a display of one of the client devices 160 for use by a software developer.

The title 505 indicates that the UI 500 is for an automatic code generation tool. The input fields 510 and 515 receive, from a software developer, a project name and a project scope for source code to be generated. The input field 520 receives, from the software developer, identifiers of personas (or roles) that will use the resulting functionality. The input field 525 receives, from the software developer, a description of what the personas wish to accomplish using the resulting functionality. The input fields 530 and 535 receive the names or other identifiers of data sources to be used by the source code, such as data services that supply data, tables within a database to be used, and the like.

The input field 540 receives a description of a workflow to be used to accomplish the goals set out in the project scope (input field 515) and user stories (input field 525). Thus, in the example of FIG. 5, there is a project that facilitates comparison of structure objects based on user-selected parameters. The workflow begins with the request creator, then moves to the object comparator.

The language of the source code may be selected from the list of supported languages (e.g., Java, Node JS, React JS, SAP UI5) using the input field 545 . . . . In the example of FIG. 5, the source code is to be generated in Java. The input fields 510-545 may be submitted for processing using the button 550. In response to detecting operation of the button 550, the software development server 140 may gather the inputs from the input fields 510-545, use them to generate a prompt, provide the generated prompt to a generative AI, and receive source code as output from the generative AI.

Figure 6:
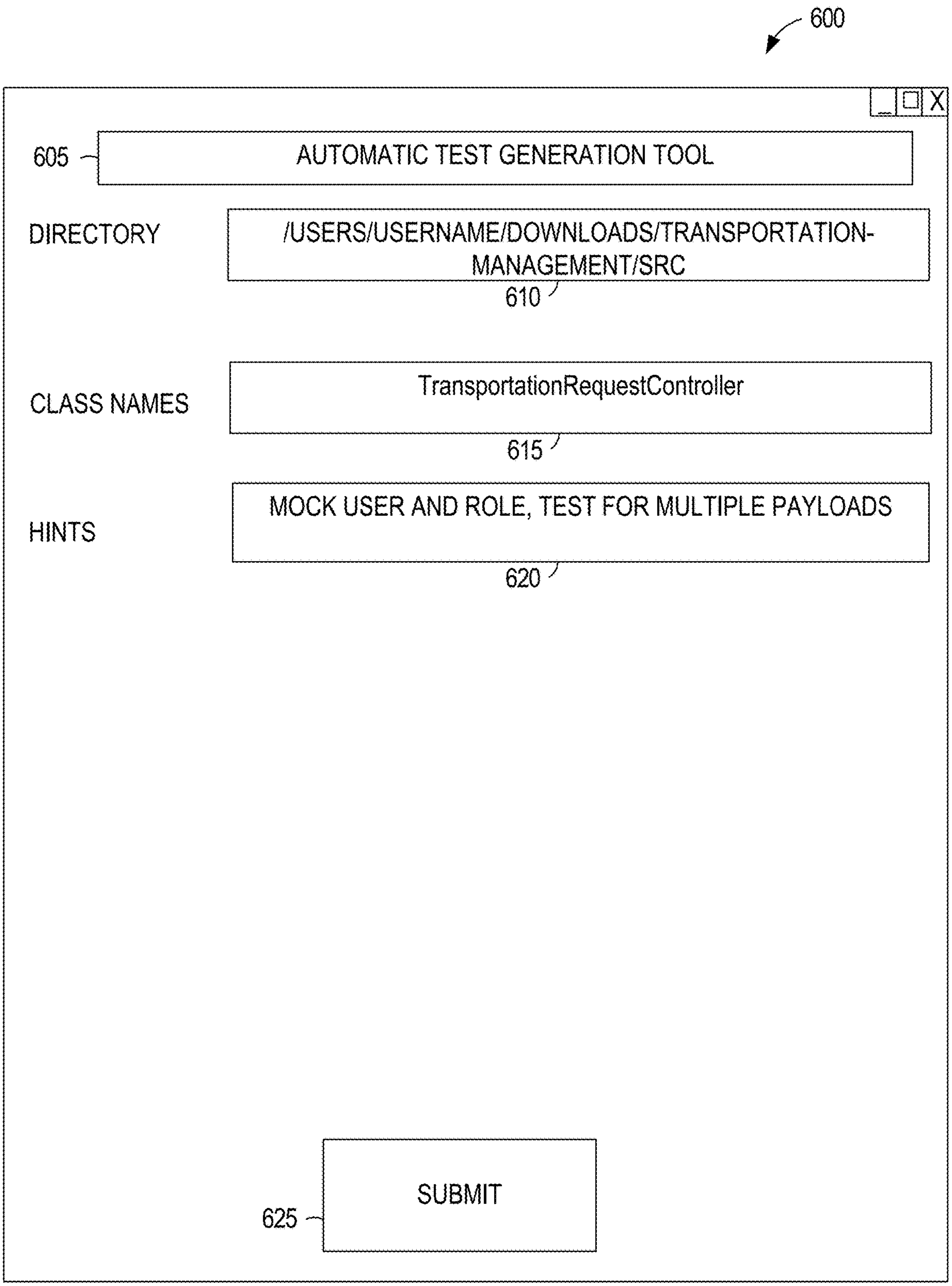
FIG. 6 shows an illustration of a UI suitable for automatic code generation using a software development efficiency engine, according to some example embodiments.

FIG. 6 shows an illustration of a UI 600 suitable for automatic code generation using a software development efficiency engine, according to some example embodiments. The UI 600 includes a title 605, input fields 610, 615, and 620, and a button 625. The UI 600 may be presented on a display of one of the client devices 160 for use by a software developer.

The title 605 indicates that the UI 600 is for an automatic test generation tool. The software development server 140 receives, via the input field 610, a name of a directory that contains the source code files for which tests are to be generated. The software development server 140 receives, via the input field 615, a name of one or more classes for which tests are to be generated. The input field 620 contains hints to a generative AI for generating tests.

The input fields 610-620 may be submitted for processing using the button 625. In response to detecting operation of the button 625, the software development server 140 may gather the inputs from the input fields 610-625, use them to generate a prompt, provide the generated prompt to a generative AI, and receive source code as output from the generative AI.

Figure 7:
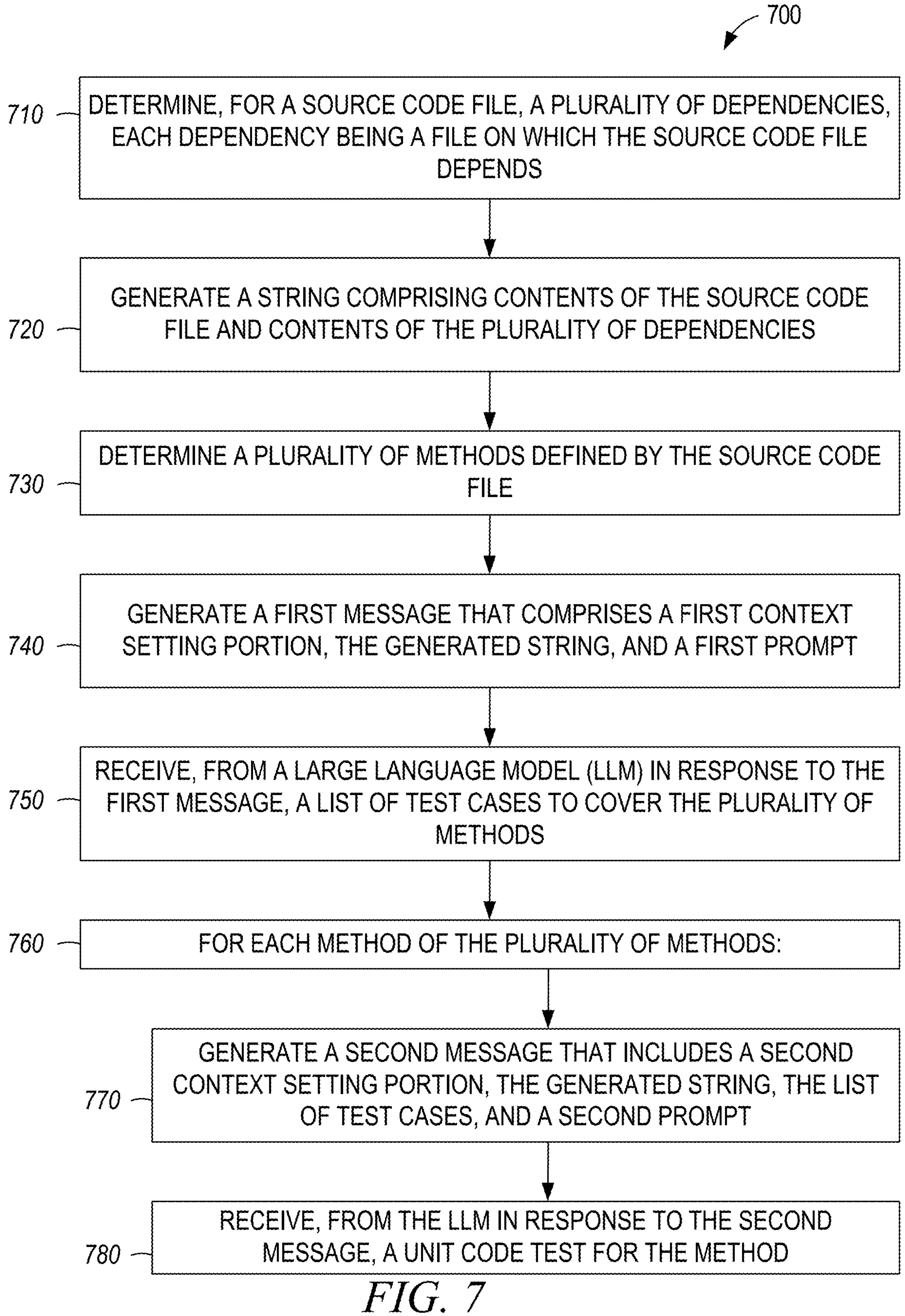
FIG. 7 shows a flowchart illustrating a method of a software development efficiency engine, according to some example embodiments.

FIG. 7 shows a flowchart illustrating a method 700 of a software development efficiency engine, according to some example embodiments. The method 700 includes operations 710, 720, 730, 740, 750, 760, 770, and 780. By way of example and not limitation, the method 700 is described as being performed by the software development server 140 of FIG. 1, using the modules of FIG. 2, the machine learning model of FIG. 3, and the UI of FIG. 6.

In operation 710, the software development server 140 determines, for a source code file, a plurality of dependencies, with each dependency being a file on which the source code file depends. For example, the UI 600 of FIG. 6 may be used to provide a directory and one or more class names to the software development server 140. A source code file may be identified based on the directory and class names. For example, the class TransportationRequestController may be defined in a TransportationRequestController.java file. Alternatively, the files in the identified directory may be scanned to determine which file defines the identified class. The dependencies for the source code file may be determined by analyzing the source code file. For example, each dependency may have a corresponding include statement. Alternatively, metadata in a metadata file or database table may identifying the dependencies for the source code file.

The dependencies of the source code file may be determined by removing all newline characters from the source code file so that the source code file may be processed as a single string. The single string is processed to generate a file list comprising all files imported into the source code file. For each file in the file list, if the file is accessible, the file is added to the dependencies of the source code file. Inaccessible files (e.g., files that are named as imported but that do not exist) are not added to the dependencies.

The software development server 140 generates, in operation 720, a string comprising contents of the source code file and contents of the plurality of dependencies. For example, the contents of the dependencies may be prepended or appended to the contents of the source code file.

In operation 730, the software development server 140 determines a plurality of methods defined by the source code file. For example, the TransportationRequestController class may include multiple methods, each of which is defined in the source code file determined from the information provided via the UI 600.

The software development server 140 generates a first message that comprises a first context setting portion, the generated string, and a first prompt (operation 740). The first context setting portion prepares an LLM to process the generated string. In some example embodiments, the first context setting portion identifies a programming language of the source code file. An example of the first context setting portion is shown below. The escape sequence "\n" is used to denote a newline character.

> You are a senior Full Stack Developer. Please carefully review and understand the enclosed user-provided document within brackets ([ ]). The document comprises one main frontend file (in .tsx format) using React JS and SAP UI5 frameworks, and optional supporting files, organized in the following structure: \n Main File: <filename> <content of the file> \n Supporting File: <filename> <content of the file> \n Devote ample time to fully comprehend the code within both the main file and any accompanying supporting files. Your task is to create comprehensive JEST unit test cases for all scenarios present in the main file. \n Instructions: Begin by thoroughly analyzing the content of the main file and any accompanying supporting files to gain a deep understanding of codebase. Your primary goal is to generate JEST unit tests that cover all scenarios within the main file. Adhere meticulously to step-by-step instructions provided by user while crafting Jest unit test code. Your role entails grasping intricacies of codebase, identifying scenarios requiring testing, and devising appropriate JEST unit tests in accordance with the provided instructions.

The identification of the programming language of the source code file may be explicit or implicit. In the example above, the identification is implicit. The React JS framework and the use of JEST unit tests are explicitly identified. The .js extension identifies a JavaScript file. JEST is a JavaScript testing framework. In other example embodiments, the identification is explicit. For example, the following sentence could be added to the first context setting portion: The source code is written in JavaScript.

The first prompt requests the LLM to generate an output based on the first message. For example, the first prompt to generate a list of unit tests could be:

> Within the main file outlined in the document, create a list of potential test cases to ensure comprehensive test coverage. While listing out the test cases you need to consider this methodology: 1) Segregate parts of code according to UI testing and Unit Testing. For Unit testing, select container components which manage the state and logic of the application. They may involve data fetching, processing, and passing props to UI components. Perform the next step only for Unit testing part. 2) For Unit testing list out all the test cases method wise. Identify ALL the methods which contains container components. Also, identify pure functions, API Integration Functions, functions having state updates and need testing of various context values. Mock context values using testing libraries' context providers. Verify that the component behaves as expected with different context values, focusing on how context affects component behavior. Identify any other additional methods which have business logic and can be unit tested. Also, if in the code a collection of functions which all qualify for unit testing are grouped together select all those methods too. Now for all those methods which you identified above, list all possible unit test cases method wise. For unit testing scenarios focus on the component's logic, data handling, and interactions with external dependencies. Ensure to cover positive, negative, and neutral test cases. Pay special attention to validating ALL conditional statements. Make sure to include unit tests that exercises both the true and false branches of the target code to improve branch coverage. Organize the list of main file functions as follows: Unit Testing: 1) Test case for <method name> method. —Test case 1—Test case 2, and so on. Emphasizing your meticulousness and attention to detail in completing this task is crucial, so please allocate the time needed to diligently follow ALL provided instructions and prepare a comprehensive list. Comprehensive line, branch and inline coverage is paramount, ensure all test cases from the reference file are listed, and no relevant methods are left unattended.

A different prompt may be generated for UI testing, such as the following example:

> Within the main file outlined in the document, create a list of potential test cases to ensure comprehensive test coverage. Make sure to identify existing relevant test identifiers (ids) for each test case. Do not list out test cases if you do not find a corresponding test id already present for it. While listing out the test cases you need to consider this methodology: 1) Segregate parts of code according to UI testing and Unit Testing. For UI testing, select UI components which are components responsible for rendering the user interface and handling user interactions. Perform the next step only for UI testing part. 2) For UI testing, list out all the potential test cases scenarios wise. Make sure to list all expected scenarios explicitly rather than only listing 'Component should be rendered as expected'. The following are the scenarios: a) Snapshot Testing: List one test case to focus on capturing and comparing component snapshots to detect UI changes. b) State Management and User Interactions: Only list out test cases that verifies that the UI correctly reflects the state changes. It assesses the functionality and visual aspects of buttons and dialogs. Test component state changes, including useState and useContext. Verify that user interactions (e.g., clicks, input) correctly update the component's state. Assess the state of buttons or dialogs, checking their functionality, such as enabled or disabled states. List test scenarios to cover testing states both before and after these interactions. c) Conditional Rendering: Test how components behave under different scenarios, including conditional rendering based on props or state changes. List a separate test case for each possible scenario, coving all branches and all parameters, providing high inline coverage. Ensure it renders appropriate content when conditions change. d) Main Component Rendering: Focus only on the primary component you are testing, ensuring it renders correctly and displays the expected content. This covers simple rendering scenarios for a main component. e) Child Component Rendering: Test how child components render within the main component. Ensure that child components, including buttons, tables, list, dropdowns, input field components etc. are rendered correctly and their content and behavior are as expected. This covers simple rendering scenarios for child components. f) Form Testing: Test form submission, validation and interactions. Simulate user input, form submissions, and validate that errors are displayed correctly. List all possible scenarios and conditions. This is a specialized type of user interaction testing. g) Error Handling: Testing error scenarios, such as API request failures, is essential for UI testing because it ensures that the UI responds appropriately to error conditions, such as displaying error messages. h) Edge Cases and Boundary Testing: This scenario can involve testing extreme or boundary cases that impact the UI, making it a part of UI testing. It checks how the UI handles unusual or extreme data and conditions. Do not mention the corresponding test ids along with test cases. Organize the list of main file scenarios as follows: UI Testing: 1) Test case for <scenario name> scenario. —Test case 1—Test case 2, and so on. Emphasizing your meticulousness and attention to detail in completing this task is crucial, so please allocate the time needed to diligently follow ALL provided instructions and prepare a comprehensive list. Comprehensive line, branch and inline coverage is paramount, ensure all test cases from the reference file are listed, and no relevant scenarios are left unattended.

Hooks are features that allow users of a class to insert custom code into specific points of the class's existing execution flow. The prompt for test hooks may be different than that for UI testing or unit testing, such as the example shown below:

Within the main file outlined in the document, compile an exhaustive list of potential integration test cases. These test cases should check all (Get, post, update, delete methods available for the API hook, validate response accuracy, behavior, and coverage. Pay special attention to validating ALL conditional statements. Make sure to include tests that exercises both the true and false response bodies of the target API hook. Organize the list of main file functions as follows: Hooks Testing: 1) Test case for <method name> hook. —Test case 1—Test case 2, and so on. Provide an approximate branch coverage percent given by the test cases.

In operation 750, the software development server 140 receives from the LLM, in response to the first message, a list of test cases to cover the plurality of methods. For example, the output below might be received:

Unit Testing:

1) Test cases for 'TieBreakerDetailPageContent' method.
   —Test case 1: Verify that the 'TieBreakerDetailPageContent' method renders correctly with the provided projectId.
   Test case 2: Verify that the 'TieBreakerDetailPageContent' method correctly maps and passes the 'projectId' and 'itemList' to the 'ItemTable' component.
2) Test cases for 'ItemTable' method.
   Test case 1: Verify that the 'ItemTable' method renders correctly with the provided props.
   Test case 2: Verify that the 'ItemTable' method correctly fetches the 'itemData' using the 'useTieBreakerItemData' hook.
   Test case 3: Verify that the 'ItemTable' method correctly handles page changes and updates the 'skip' reference and 'payload' parameters.
   Test case 4: Verify that the 'ItemTable' method correctly passes props to the 'Dynamic Table' component.
3) Test cases for 'getTitle' method.
   Test case 1: Verify that the 'getTitle' method correctly generates the title string with the provided index, itemName, and totalCount.
   Test case 2: Verify that the 'getTitle' method correctly handles cases where totalCount is not provided.
4) Test cases for 'getMessageStrip' method.
   Test case 1: Verify that the 'getMessageStrip' method correctly generates the 'MessageStrip' component when the ranking is 1.
   Test case 2: Verify that the 'getMessageStrip' method returns an empty fragment when the ranking is not 1.
5) Test cases for 'getItemHeader' method.
   Test case 1: Verify that the 'getItemHeader' method correctly renders the 'title' and 'messageStrip' in a 'FlexBox' component.
6) Test cases for 'DynamicTable' method in the supporting file.
   Test case 1: Verify that the 'DynamicTable' method correctly renders with the provided props.
   Test case 2: Verify that the 'DynamicTable' method correctly filters out records with a ranking of 1.
   Test case 3: Verify that the 'DynamicTable' method correctly handles page changes.
   Test case 4: Verify that the 'DynamicTable' method correctly generates column definitions using the 'useColumns' hook.
7) Test cases for 'useColumns' method in the supporting file.
   Test case 1: Verify that the 'useColumns' method correctly generates column definitions.
   Test case 2: Verify that the 'useColumns' method correctly handles different status types in the 'getIcon' function.

8) Test cases for ‘getIcon’ method in the supporting file.
   - Test case 1: Verify that the ‘getIcon’ method correctly returns an ‘Icon’ component for different status types.
   - Test case 2: Verify that the ‘getIcon’ method returns an empty fragment when the status type does not match any known types.

Operation 760 causes the software development server 140 to perform operations 770 and 780 for each method of the plurality of methods. In operation 770, the software development server 140 generates a second message that includes a second context setting portion, the generated string, the list of test cases, and a second prompt. In some example embodiments, the second prompt identifies the method. An example second prompt for unit testing is shown below. The values in curly braces are substituted with relevant data before the second message is provided to the LLM. For example, the “{fun_name}” text may be replaced by the name of the method for which the current iteration of operations 770 and 780 is being performed.

Utilize the provided reference file enclosed in triple quotes “”, which enumerates feasible unit test cases for the main file. Carefully craft JEST test code for the {fun_name} function within the main file. Include all test cases listed in the reference and propose additional test cases not covered. Add a test to check if the service is correctly instantiated. Add assertions to check if the mocked methods have been called with the expected arguments. Follow TypeScript and use type annotations to specify return types and argument types as needed. Every variable, function parameter, and return value in codebase must have explicit and accurate type annotations. Using ‘any’ should be avoided at all costs to ensures that codebase remains maintainable and free from runtime type errors. Should the function be private, assess it using a public counterpart. Ensure that imported constants are treated as read-only. Assigning new values to imported constants is strictly prohibited. \nUse ‘describe’ to group related test cases. \nPrepare a comprehensive mock of context value with all parameters for rendering the page. \nExclude import and mocking of AuthContext. \nUse ‘beforeEach’ to set up common test conditions and mock context values. \n\n Write individual test cases using ‘test’ or ‘it’. If a component has event handlers (e.g., click events, form submissions), test how it responds to user interactions and check if the component’s state changes as expected. Simulate these interactions and state changes and verify that the component behaves as expected. \nIf component uses methods or functions, makes API calls or fetches data during rendering, test how it handles these asynchronous operations. Mock methods and API calls to ensure that the component behaves correctly based on the data it receives. Use jest.requireActual within the context of jest.mock to retrieve the original implementation of a function and use it alongside custom mock implementation. Mocking Example 1: \n const {itemList}=useGetTBItemsList(projectId);return (<FlexBox direction=\“Column\” data-testid=\“tie-breaker-details-page-content\”> {itemList?.map((item: TBItemListQueryResponse, index: number) Then corresponding mock should be \n jest.mock(\“@dataclient\”, ( )=>({jest.requireActual(\“@dataclient\”), useGetTBItemsList: ( ): {itemList: TBItemListQueryResponse [ ];refetch: jest.Mock;}=> ({refetch: jest.fn( ),itemList: require (\“./mockData/TBItemListData.json\”),}) Write individual test cases that exercise each function or API call scenario. For each test case, ensure main file’s component (where calls are made) is executed. Make sure to invoke the component’s logic that triggers the function call. Use “await” or other asynchronous testing techniques to wait for the API call to complete. Assert that component behaves as expected based on function call’s response and parameters. Ensure that you have test cases covering all the different dependency scenarios. \nIf the component uses context values, follow these steps: \n Use jest.mock to mock the context module. \n Provide a mock implementation of the context’s Provider component to set context values for testing. \n render the component within the context provider to access context values. \n Ensure that the component interacts correctly with context values. Import all necessary dependencies and relevant methods. \n While mocking dependencies, meticulously address the following: a) Set up an appropriate foundation for jest tests. b) Identify and tell the type of class in the context of web frameworks like NestJS. For each class be it service or controller or otherwise do follow the below steps: —Provide a comprehensive list of external services (APIs, databases, classes, and methods) that the class interacts with. —Create distinct NestJS providers for each service, encapsulating logic and methods effectively. Use ‘use Value’ if mock is an object, ‘useClass’ if mock is a class. Integrate tests to validate that the logger is invoked as expected by creating a spy on the logger method and verifying its calls with the anticipated arguments. —Utilize the @Inject( ) decorator to integrate these providers into the required classes or modules, enabling efficient dependency injection. —Configure the providers by setting up accurate details, such as API endpoints or database information. —Apply @Injectable( ) decorator to these providers to establish them as injectable components within the application. —Declare providers in modules for injection accessibility. —Inject the services within the service or controller classes through constructors, utilizing appropriate private/public access modifiers. —Efficiently apply these injected services to fulfil required tasks, such as executing API calls or database queries or calling other services. —Lastly, construct comprehensive unit tests for classes/services, ensuring precise isolation and accuracy by meticulously mocking the injected services. —Configure the behavior of each mock object, integrate the behavior into the test case, and restore the original spy object. —CLEAR, RESET, and RESTORE mocks after each test case. —Ensure that your generated code comprehensively covers ALL TEST CASES detailed in the reference. Enclose the components within <ThemeProvider> and <DataClientProvider> Example 2: render (<ThemeProvider> <DataClientProvider> <PrimaryStory/></DataClientProvider></ThemeProvider>). Authorization should be managed directly within the <DataClientProvider> code for the components responsible for network requests. Ensure that parameters are correctly defined, and match expected values when testing a component. Utilize the main and supporting files fully for following above steps. Strive to streamline the developer’s workload by minimizing the need for extra lines in your generated code, thereby optimizing the overall code-writing process. Emphasizing your meticulousness and attention to detail in completing this task is crucial, so please allocate the time needed to diligently follow ALL the above instructions.

The second prompt may differ for UI testing and hook testing. An example second prompt for UI testing is:

Utilize the provided reference file enclosed in triple quotes "", which enumerates feasible unit test cases for the main file. Carefully craft JEST test code for the {fun_name} function within the main file. Include all test cases listed in the reference and propose additional test cases not covered. Add a test to check if the service is correctly instantiated. Add assertions to check if the mocked methods have been called with the expected arguments. Follow TypeScript and use type annotations to specify return types and argument types as needed. Every variable, function parameter, and return value in the codebase must have explicit and accurate type annotations. Using 'any' should be avoided at all costs to ensure that the codebase remains maintainable and free from runtime type errors. Should the function be private, assess it using a public counterpart. Ensure that imported constants are treated as read-only. Assigning new values to imported constants is strictly prohibited. \nUse 'describe' to group related test cases. \nPrepare a comprehensive mock of context value with all parameters for rendering the page. \nExclude import and mocking of AuthContext. \nUse 'beforeEach' to set up common test conditions and mock context values. \n\n Write individual test cases using 'test' or 'it'. If a component has event handlers (e.g., click events, form submissions), test how it responds to user interactions and check if the component's state changes as expected. Simulate these interactions and state changes and verify that the component behaves as expected. \nIf the component uses methods or functions, makes API calls or fetches data during rendering, test how it handles these asynchronous operations. Mock methods and API calls to ensure that the component behaves correctly based on the data it receives. Use jest.requireActual within the context of jest.mock to retrieve the original implementation of a function and use it alongside custom mock implementation. Mocking Example 1: \n const {itemList}=useGetTBItemsList(projectId); return (<FlexBox direction=\"Column\" data-testid=\"tie-breaker-details-page-content\"> {itemList?.map((item: TBItemListQueryResponse, index: number) Then corresponding mock should be \n jest.mock(\"@dataclient\", ( )=>({jest.requireActual (\"@dataclient\"), useGetTBItemsList: ( ): {itemList: TBItemListQueryResponse[ ];refetch: jest.Mock;}=> ({refetch: jest.fn( ),itemList: require(\"./mockData/TBItemListData.json\"),}) Write individual test cases that exercise each function or API call scenario. For each test case, ensure main file's component (where calls are made) is executed. Make sure to invoke the component's logic that triggers the function call. Use "await" or other asynchronous testing techniques to wait for the API call to complete. Assert that the component behaves as expected based on a function call's response and parameters. Ensure that you have test cases covering all the different dependency scenarios. \nIf the component uses context values, follow these steps: \n Use jest.mock to mock the context module. \n Provide mock implementation of the context's Provider component to set context values for testing. \n render the component within the context provider to access context values. \n Ensure that the component interacts correctly with context values. Import all necessary dependencies and relevant methods. \n While mocking dependencies, meticulously address the following: a) Set up an appropriate foundation for JEST tests. b) Identify and tell the type of class in the context of web frameworks like NestJS. For each class, be it service or controller or otherwise, do follow the below steps: —Provide a comprehensive list of external services (APIs, databases, classes, and methods) that the class interacts with. —Create distinct NestJS providers for each service, encapsulating logic and methods effectively. Use 'use Value' if mock is an object, 'useClass' if mock is a class. Integrate tests to validate that the logger is invoked as expected by creating a spy on the logger method and verifying its calls with the anticipated arguments. —Utilize the @Inject( ) decorator to integrate these providers into the required classes or modules, enabling efficient dependency injection. —Configure the providers by setting up accurate details, such as API endpoints or database information. —Apply @Injectable( ) decorator to these providers to establish them as injectable components within the application. —Declare providers in modules for injection accessibility. —Inject the services within the service or controller classes through constructors, utilizing appropriate private/public access modifiers. —Efficiently apply these injected services to fulfil required tasks, such as executing API calls or database queries or calling other services. —Lastly, construct comprehensive unit tests for classes/services, ensuring precise isolation and accuracy by meticulously mocking the injected services. —Configure the behavior of each mock object, integrate into the test case, and restore the original spy object. —CLEAR, RESET, and RESTORE mocks after each test case. —Ensure that your generated code comprehensively covers ALL TEST CASES detailed in the reference. Enclose the components within <ThemeProvider> and <DataClientProvider> Example 2: render (<ThemeProvider> <DataClientProvider> <PrimaryStory/></DataClientProvider></ThemeProvider>). Authorization should be managed directly within the <DataClientProvider> code for the components responsible for network requests. Ensure that parameters are correctly defined, and match expected values when testing a component. Utilize the main and supporting files fully for following above steps. Strive to streamline the developer's workload by minimizing the need for extra lines in your generated code, thereby optimizing the overall code-writing process. Emphasizing your meticulousness and attention to detail in completing this task is crucial, so please allocate the time needed to diligently follow ALL the above instructions.

An example second prompt for hooks testing is:

Utilize the provided reference file enclosed in triple quotes "", which enumerates feasible test cases for the main file. Carefully craft Integration test code for the {fun_name} API hook within the main file to verify the existence and functionality of all API hook endpoints. For each test case, create comprehensive integration tests for ReactJS custom hooks that interact with API hook endpoints using a DataClient. Utilize testing utilities from @testing-library/react-hooks and nock to simulate various API hook scenarios. \n\n1. Import Necessary Modules and Functions: Import the required testing utilities from @testing-library/react-hooks and nock. Ensure that constants and types from the application code are appropriately imported. \n\n2. Define Test Data: Define the test data that will be returned by mocked HTTP requests during the tests. Consider various scenarios, including successful API hook responses, errors, and edge cases. The response object has a property named data, which must be extracted from the response object returned by the doGet function. Carefully examine the dependent files to get the exact data. \n\n3. Group Tests with describe Function: Use the describe function to group related tests together, providing clarity and organization. \n\n4. Clean Up with afterEach Hook: Utilize the afterEach hook to clean up after each test execution. Use nock-.cleanAll( ) to remove any outstanding mocks. Use cleanup to unmount any components that were rendered during the test. \n\n5. Write Individual Tests with IT Function: Use the IT function to define individual tests, each simulating a specific scenario. Check that the custom hook behaves as expected under different conditions. \n\n6. Set Up Mock HTTP Requests with nock: Use the nock function to set up mock HTTP requests. Utilize the get method to specify the URL of the request. Use the reply method to specify the response that should be returned. \n\n7. Render the Hook with renderHook Function: Use the renderHook function to render the custom hook and obtain its result. Provide any necessary context using the wrapper option-define the wrapper one time as const {wrapper}=prepareAxiosTest( ) and then always simply pass this wrapper. \n\n8. Wait for Hook Update with waitFor Function: Use the waitFor function to wait for the custom hook to update its result. \n\n9. Verify Results with expect Function: Use the expect function to check that the hook's result matches the expected value. Ensure comprehensive coverage of test scenarios. \n\n10. Verify Mock HTTP Requests with done Method: Call the done method on the mock HTTP request to verify that it was made. If the request was not made, this should cause the test to fail. \n\nExpectations: \n—Scenario Coverage: Ensure tests cover various scenarios, including successful responses, error handling, and edge cases. \n—Code Clarity: Write clear and concise tests with descriptive names. \n—Mock Setup: Verify that mock HTTP requests are appropriately set up for each test case. \n—Result Validation: Confirm that the hook's result is validated against expected values. \n—Clean Execution: Ensure proper cleanup after each test to avoid interference with subsequent tests. \n\nMake sure that the code is comprehensive and must not contain any incomplete parts or pseudo code. Consider any additional steps required for your specific use case. This may involve handling authentication tokens, managing session state, or any other steps necessary for your api hook's integration testing. Remember that your task is to generate a complete integration test setup for a ReactJS project. Ensure that your generated Integration Test code comprehensively covers ALL Test cases mentioned in the reference file and cover edge cases and other scenarios as needed to provide high coverage. Utilize the main and supporting files fully for following above steps. Strive to streamline the developer's workload by minimizing the need for extra lines in your generated code, thereby optimizing the overall code-writing process. It is absolutely mandatory that you do provide actual test cases based on your understanding of the application's business logic and requirements, and not only a high-level code The second prompt may be determined based on a programming language of the source code file, based on whether the method is a UI method or a backend method, or any suitable combination thereof. The example second prompt above discusses JEST test code, which may be suitable for JavaScript source code files. A second prompt for source code files in a different programming language may include specific instructions relating to that programming language instead. A UI method is a method that relates to a UI. For example, a method that responds to a button press by invoking a backend function or modifying the UI is a UI method. A backend method performs operations without interacting with a UI. For example, a method that computes a value based on data is a backend method.

In operation 780, the software development server 140 receives from the LLM, in response to the second message, a unit code test for the method. For example, the output below might be received:

```
Certainly, let's create Jest test cases for the Snapshot Testing
scenario. We will be testing the 'TieBreakerDetailPageContent'
component. Please note that we need to mock the
'useGetTBItemsList' hook which is being used in the component.
"'tsx
// Import necessary libraries and components
import { render, cleanup } from '@testing-library/react';
import { TieBreakerDetailPageContent } from
'../TieBreakerDetailPageContent';
import { TBItemListQueryResponse } from "@dataclient";
import { useGetTBItemsList } from "@dataclient";
// Mocking the useGetTBItemsList hook
jest.mock("@dataclient", ( ) => ({
  ...jest.requireActual("@dataclient"),
  useGetTBItemsList: jest.fn( ),
}));
// Clean up after each test
afterEach(cleanup);
describe('TieBreakerDetailPageContent', ( ) => {
  const mockResponse: TBItemListQueryResponse[ ] = [
    {
      itemNumber: '1',
      name: 'Item 1',
      ranking: 1,
      supplierName: 'Supplier 1',
      vendorId: 'V1',
      currency: 'USD',
      totalValue: '1000',
    },
    {
      itemNumber: '2',
      name: 'Item 2',
      ranking: 2,
      supplierName: 'Supplier 2',
      vendorId: 'V2',
      currency: 'USD',
      totalValue: '2000',
    },
  ];
  beforeEach(( ) => {
    (useGetTBItemsList as jest.Mock).mockReturnValue({
      itemList: mockResponse,
    });
  });
  test('matches snapshot', ( ) => {
    const { asFragment } = render(<TieBreakerDetailPageContent
projectId="1" />);
    expect(asFragment( )).toMatchSnapshot( );
  });
});
'''
In the above test case, we are rendering the
'TieBreakerDetailPageContent' component with a 'projectId' prop
and then taking a snapshot of the rendered component. We have
also mocked the 'useGetTBItemsList' hook to return a mock
response. This test will pass if the rendered component matches the
snapshot stored from the last test run. If the component's output
```

-continued changes in the future, the snapshot test will fail, and we can then update the snapshot if the changes are intended.
Please note that you need to have the snapshot serializer for Jest installed and correctly configured in your project to use snapshot testing.

After operation 760 completes, operations 770 and 780 will have been performed for all methods of the plurality of methods. Thus, a unit code test will have been generated for all methods of the plurality of methods. Accordingly, the method 700 serves to generate unit code tests for a source code file with reduced effort compared to typical programming techniques and reduced error compared to typical LLM usage techniques, thereby improving the functionality of the software development server 140 when applied to the task of developing software.

Figure 8:
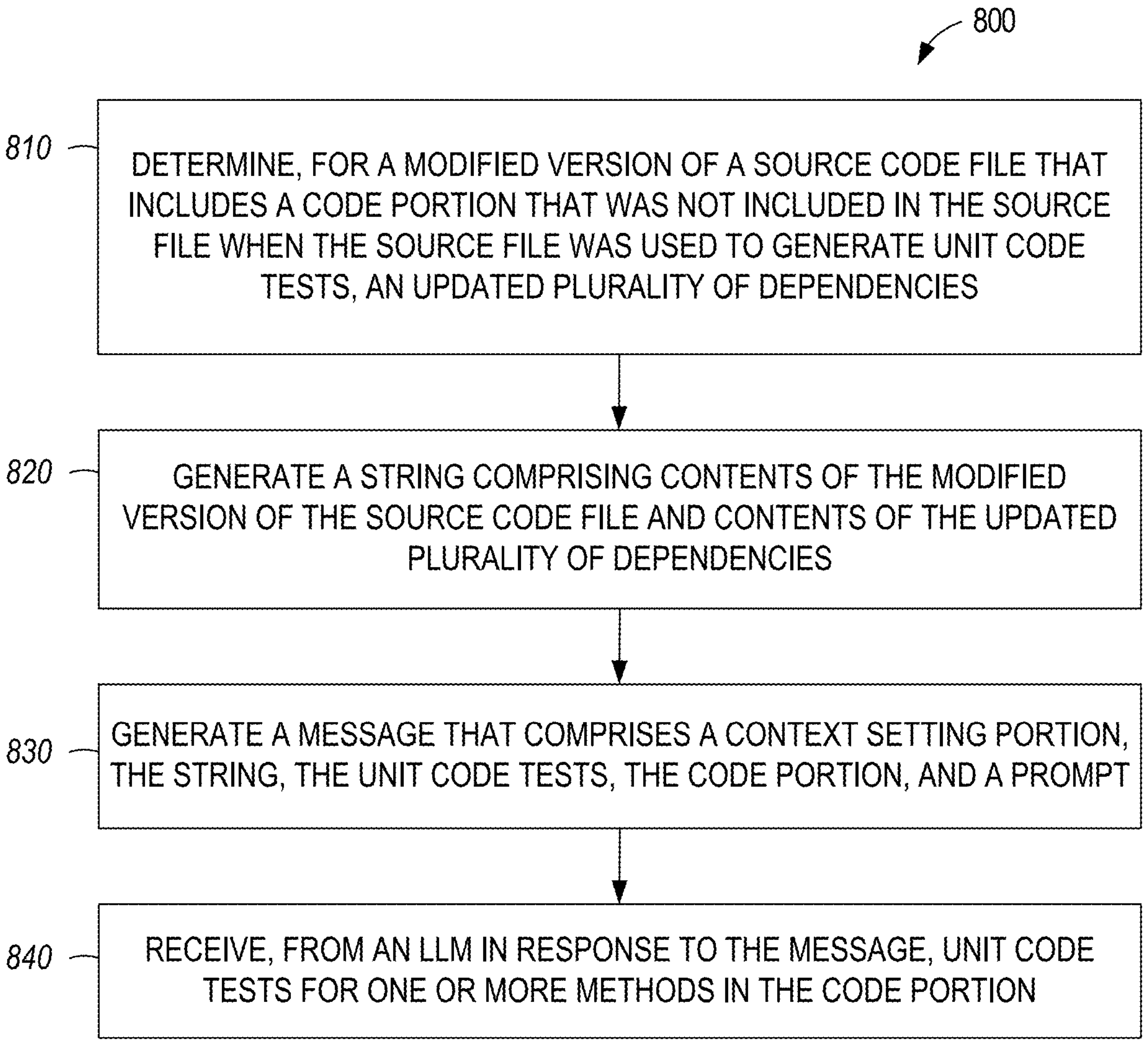
FIG. 8 shows a flowchart illustrating a method of a software development efficiency engine, according to some example embodiments.

FIG. 8 shows a flowchart illustrating a method 800 of a software development efficiency engine, according to some example embodiments. The method 800 includes operations 810, 820, 830, and 840. By way of example and not limitation, the method 800 is described as being performed by the software development server 140 of FIG. 1, using the modules of FIG. 2, the machine learning model of FIG. 3, and the UI of FIG. 4. The method 800 may be performed after a period of time has elapsed since performing the method 700.

In operation 810, the software development server 140 determines an updated plurality of dependencies for a modified version of a source code file that includes a code portion that was not included in the source file when the source file was used to generate unit code tests. For example, the UI 600 of FIG. 6 may be used to provide a directory and one or more class names to the software development server 140. A source code file may be identified based on the directory and class names. The current version of the source code file may be compared to a previous version of the source code file to identify changes, such as added, deleted, or moved code portions.

For example, the source code file below may be accessed, wherein the italicized portion is a code portion that was not included in the source file when the source file was used to generate unit code tests.

```
import { ApiOperation, ApiTags } from "@nestjs/swagger";
import { BaseController } from "@api-interface";
import { Scopes, UserScopes } from "@config";
import { ABCNotFoundException } from "@exception-handling";
import { GenericErrorCodes } from "@type-constants";
import { AttachmentAPIResponseDescription } from
"../../../application/constants/AttachmentConstants";
import {
AttachmentService,
ATTACHMENT_SERVICE,
} from "../../../core/port/AttachmentService";
import { AttachmentFilterableFields } from "../../../core/query/AttachmentFilterableFields";
import { AttachmentDTO } from "../../dto/metadata/AttachmentDTO";
import { AttachmentsDTO } from "../../dto/metadata/AttachmentsDTO";
import { AttachmentsByEntityQueryParameters } from
"../../query/AttachmentsByEntityQueryParameters";
import { AttachmentConverter } from "./converter/AttachmentConverter";
import {
GetAttachmentsByEntityType,
GetAttachmentsByOrigin,
} from "./swagger/AttachmentDecorator";
@ApiTags("Attachment")
@Controller("api/v1/attachment-data")
export class AttachmentController extends BaseController {
constructor(
@Inject(ATTACHMENT_SERVICE)
private readonly attachmentService: AttachmentService
) {
super( );
}
@ ApiOperation({
summary:
"Fetch a list of attachment details corresponding to an entity type",
description: "Gets a list of attachment details by entity type",
})
@GetAttachmentsByEntityType
@Get("/entity/:entityType")
@Scopes(UserScopes.EMPLOYEE)
public async getAttachmentsByEntityType(
@Param("entityType") entityType: string,
@Query( ) query: AttachmentsByEntityQueryParameters
): Promise<AttachmentsDTO> {
const queryParameters =
this.getQueryParam<AttachmentFilterableFields>(query);
const [attachments, count] =
await this.attachmentService.getAttachmentsByEntityType(
entityType,
queryParameters
);
return AttachmentConverter.createAttachmentsDTO(attachments, count);
}
@ApiOperation(
```

-continued

```
summary:
"Fetch attachment details corresponding to originalAttachmentId and attachment Origin",
description:
"Gets attachment details by originalAttachmentId and attachment Origin",
})
@GetAttachmentsByOrigin
@Get("/origin/:attachmentOrigin/:originalAttachmentId")
@Scopes(UserScopes.EMPLOYEE)
public async getAttachmentByOrigin(
@Param("attachmentOrigin") attachmentOrigin: string,
@Param("originalAttachmentId") originalAttachmentId: string
): Promise <AttachmentDTO> {
const attachment = await this.attachmentService.getAttachmentByOrigin(
attachmentOrigin,
originalAttachmentId
);
if (attachment) {
return AttachmentConverter.convertEntityToDTO(attachment);
}
throw new NotFoundException(
AttachmentAPIResponseDescription.ATTACHMENT__NOT__FOUND__FOR__ORIGIN,
GenericErrorCodes.ATTACHMENT__NOT__FOUND
);
}
}
```

The software development server 140 generates, in operation 820, a string comprising contents of the modified version of the source code file and contents of the updated plurality of dependencies. For example, the contents of the dependencies may be prepended or appended to the contents of the modified version of the source code file.

The software development server 140 generates a first message that comprises a context setting portion, the generated string, and a prompt (operation 830). The first context setting portion prepares an LLM to process the generated string. For example, the first context setting portion could be:

Examine the provided document enclosed in brackets ([ ]), which includes the modified version of the main file, optional supporting files, a previous version of the test file, and a specific portion of code that was modified in the main file. The structure is as follows: Main File <file content> Supporting Files: <filename> <content of the file> Test File <file content> Code Chunk <code chunk>. The test file consists of comprehensive Jest unit test cases for a previous version of main file. Devote ample time to fully comprehend the code within both the main file and any accompanying supporting files. Your task is to Update the test file based on modifications made to the main file's code chunk. Generate an output that adds only the necessary code changes to the test file, reflecting the modifications made to the code chunk in the main file.

The prompt could be:

Analyze the 'Code chunk' from the main file to identify the specific code changes. Then Examine the 'Test file' to determine the corresponding test cases related to the modified code. Intelligently identify the delta changes between the 'Main file' and the 'Test file' for the code chunk. Incorporate these delta changes into the 'Test file' to align it with the modifications made in the 'Main file'. Create appropriate mock objects where needed. Finally, ensure that the added code accurately reflects the changes and integrates with the existing test cases. In the end, provide an explanation of the delta changes added.

In operation 840, the software development server 140 receives from the LLM, in response to the message, a list of test cases to cover the plurality of methods. For example, the output below might be received:

Based on the provided code chunk from the main file, the method 'getAttachmentByOrigin' in the 'AttachmentController' class has been modified or added. This method fetches attachment details corresponding to originalAttachmentId and attachment Origin. If the attachment is not found, it throws a 'NotFoundException' with the message 'AttachmentAPIResponseDescription.ATTACHMENT_NOT_FOUND_FOR_ORIGIN'.

The corresponding test case for this method is not found in the provided test file. Therefore, we need to add a new test case for this method in the 'AttachmentController.spec.ts' file.

Here is the additional code for the test file:

```
typescript
describe("getAttachmentByOrigin", ( ) => {
  it("if attachment is found, then should call attachment service and
return attachmentDTO from converter", async ( ) => {
    const attachmentDTO = new AttachmentDTOStub( );
    jest.spyOn(AttachmentConverter,
"convertEntityToDT0").mockReturn Value(attachmentDT0);
    attachmentServiceGetAttachmentsByOriginSpy = jest.spyOn(
attachmentService, "getAttachmentByOrigin");
    expect(await attachmentController.getAttachmentByOrigin(
ATTACHMENT__ORIGIN, ORIGINAL__ATTACHMENT__ID)).
toBe(attachmentDT0);
    expect( attachmentServiceGetAttachmentsByOriginSpy).
toHaveBeenCalled( );
  });
it("if attachment is not found, then should call attachment service
and throw NotFoundException", async ( ) => {
  jest.SpyOn(attachmentService, "getAttachmentByOrigin").
mockResolvedValue(null);
    await expect(attachmentController.getAttachmentByOrigin(
ATTACHMENT__ORIGIN, ORIGINAL__ATTACHMENT__ID)).
rejects.toThrow(NotFoundException);
    expect( attachmentServiceGetAttachmentsByOriginSpy).
toHaveBeenCalled( );
....
```

Thus, a unit code test will have been generated for the additional or modified methods. Accordingly, the method 800 serves to generate unit code tests for a modified source code file with reduced effort compared to typical programming techniques and reduced error compared to typical LLM usage techniques, thereby improving the functionality of the software development server 140 when applied to the task of developing software.

Figure 9:
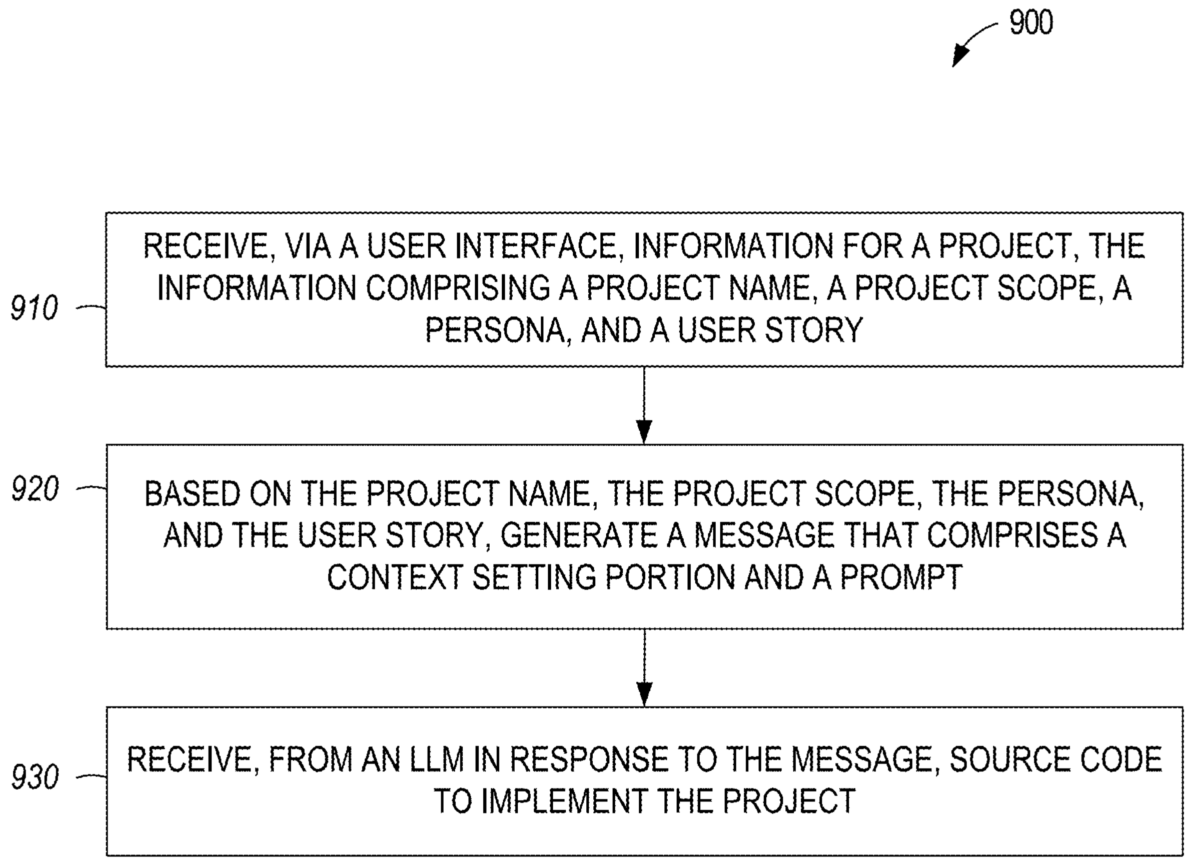
FIG. 9 shows a flowchart illustrating a method of a software development efficiency engine, according to some example embodiments.

FIG. 9 shows a flowchart illustrating a method 900 of a software development efficiency engine, according to some example embodiments. The method 900 includes operations 910, 920, and 930. By way of example and not limitation, the method 900 is described as being performed by the software development server 140 of FIG. 1, using the modules of FIG. 2, the machine learning model of FIG. 3, and the UI of FIG. 5.

In operation 910, the software development server 140 receives, via the UI 500 of FIG. 5, information for a project, the information comprising a project name, a project scope, a persona, and a user story. Based on the project name, the project scope, the persona, and the user story, the software development server 140, in operation 920, generates a message that comprises a context setting portion and a prompt.

The software development server 140 receives, from an LLM in response to the message, source code to implement the project. For example, the resulting output from the LLM could begin:

```
User Story: As an Engineering Manager, I want to compare 2 different Engineering BOM
Structure objects based on different parameters.
1. Search structure object from structure search screen
public List<StructureObject> searchStructureObject(String searchQuery) {
   if (searchQuery == null || searchQuery.isEmpty( )) {
      throw new InvalidInputException("Search query cannot be empty");
   }
   List<StructureObject> structureObjectList =
structureOjbectRepository.searchStructureObjects(searchQuery);
   if (structureObjectList.isEmpty( )) {
      throw new NotFoundException(}No structure objects found});
   }
   return structureObjectList;
}
2. Select 2 Structure objects
public StructureObject selectStructureObject(List<StructureObject> structureObjectList, int
index) {
   if (structureObjectList == null || structureObjectList.isEmpty( )) {
      throw new InvalidInputException("Structure object list cannot be empty");
   }
   if (index < 0 || index >= structureOjbectList.size( ) {
      throw new InvalidIndexException("Invalid Index")
...
```

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system for generating unit code tests, the system comprising: a memory that stores instructions; and one or more processors coupled to the memory and configured to execute the instructions to perform operations comprising: determining, for a source code file, a plurality of dependencies, each dependency being a file on which the source code file depends; generating a string comprising contents of the source code file and contents of the plurality of dependencies; determining a plurality of methods defined by the source code file; generating a first message that comprises a first context setting portion, the generated string, and a first prompt; receiving, from a large language model (LLM) in response to the first message, a list of test cases to cover the plurality of methods; and for each method of the plurality of methods: generating a second message that comprises a second context setting portion, the generated string, the list of test cases, and a second prompt; and receiving, from the LLM in response to the second message, a unit code test for the method.

In Example 2, the subject matter of Example 1, wherein the first context setting portion identifies a programming language of the source code file.

In Example 3, the subject matter of Examples 1-2, wherein the second prompt identifies the method.

In Example 4, the subject matter of Examples 1-3, wherein the second prompt is determined based on a programming language of the source code file.

In Example 5, the subject matter of Examples 1-4, wherein the second prompt is determined based on whether the method is a user interface (UI) method or a backend method.

In Example 6, the subject matter of Examples 1-5, wherein the determining, for the source code file, the plurality of dependencies comprises: removing all newline characters from the source code file; generating a file list comprising all files imported into the source code file; and for each file in the file list, if the file is accessible, adding the file to the plurality of dependencies.

In Example 7, the subject matter of Examples 1-6, wherein the operations further comprise: determining an updated plurality of dependencies for a modified version of the source code file that includes a code portion that was not included in the source code file when it was used to generate the unit code tests; generating a second string comprising contents of the modified version of the source code file and contents of the updated plurality of dependencies; generating a third message that comprises a third context setting portion, the second string, the unit code tests generated for the methods of the source code file, the code portion, and a third prompt; and receiving, from the LLM in response to the third message, unit code tests for one or more methods in the code portion.

In Example 8, the subject matter of Examples 1-7, wherein the operations further comprise: receiving, via a user interface, information for a project, the information comprising a project name, a project scope, a persona, and a user story; based on the project name, the project scope, the persona, and the user story, generating a third message that comprises a third context setting portion and a third prompt; and receiving, from the LLM in response to the third message, source code to implement the project.

Example 9 is a non-transitory computer-readable medium that stores instructions that, when executed by one or more processors, cause the one or more processors to perform operations comprising: determining, for a source code file, a plurality of dependencies, each dependency being a file on which the source code file depends; generating a string comprising contents of the source code file and contents of the plurality of dependencies; determining a plurality of methods defined by the source code file; generating a first message that comprises a first context setting portion, the generated string, and a first prompt; receiving, from a large language model (LLM) in response to the first message, a list of test cases to cover the plurality of methods; and for each method of the plurality of methods: generating a second message that comprises a second context setting portion, the generated string, the list of test cases, and a second prompt; and receiving, from the LLM in response to the second message, a unit code test for the method.

In Example 10, the subject matter of Example 9, wherein the first context setting portion identifies a programming language of the source code file.

In Example 11, the subject matter of Examples 9-10, wherein the second prompt identifies the method.

In Example 12, the subject matter of Examples 9-11, wherein the second prompt is determined based on a programming language of the source code file.

In Example 13, the subject matter of Examples 9-12, wherein the second prompt is determined based on whether the method is a user interface (UI) method or a backend method.

In Example 14, the subject matter of Examples 9-13, wherein the determining, for the source code file, the plurality of dependencies comprises: removing all newline characters from the source code file; generating a file list comprising all files imported into the source code file; and for each file in the file list, if the file is accessible, add the file to the plurality of dependencies.

In Example 15, the subject matter of Examples 9-14, wherein the operations further comprise: determining an updated plurality of dependencies for a modified version of the source code file that includes a code portion that was not included in the source code file when it was used to generate the unit code tests; generating a second string comprising contents of the modified version of the source code file and contents of the updated plurality of dependencies; generating a third message that comprises a third context setting portion, the second string, the unit code tests generated for the methods of the source code file, the code portion, and a third prompt; and receiving, from the LLM in response to the third message, unit code tests for one or more methods in the code portion.

In Example 16, the subject matter of Examples 9-15, wherein the operations further comprise: receiving, via a user interface, information for a project, the information comprising a project name, a project scope, a persona, and a user story; based on the project name, the project scope, the persona, and the user story, generating a third message that comprises a third context setting portion and a third prompt; and receiving, from the LLM in response to the third message, source code to implement the project.

Example 17 is a method comprising: determining, for a source code file, a plurality of dependencies, each dependency being a file on which the source code file depends; generating, by one or more processors, a string comprising contents of the source code file and contents of the plurality of dependencies; determining a plurality of methods defined by the source code file; generating a first message that comprises a first context setting portion, the generated string, and a first prompt; receiving, from a large language model (LLM) in response to the first message, a list of test cases to cover the plurality of methods; and for each method of the plurality of methods: generating a second message that comprises a second context setting portion, the generated string, the list of test cases, and a second prompt; and receiving, from the LLM in response to the second message, a unit code test for the method.

In Example 18, the subject matter of Example 17, wherein the first context setting portion identifies a programming language of the source code file.

In Example 19, the subject matter of Examples 17-18, wherein the second prompt identifies the method.

In Example 20, the subject matter of Examples 17-19, wherein the second prompt is determined based on a programming language of the source code file.

Example 21 is an apparatus comprising means to implement of any of Examples 1-20.

Figure 10:
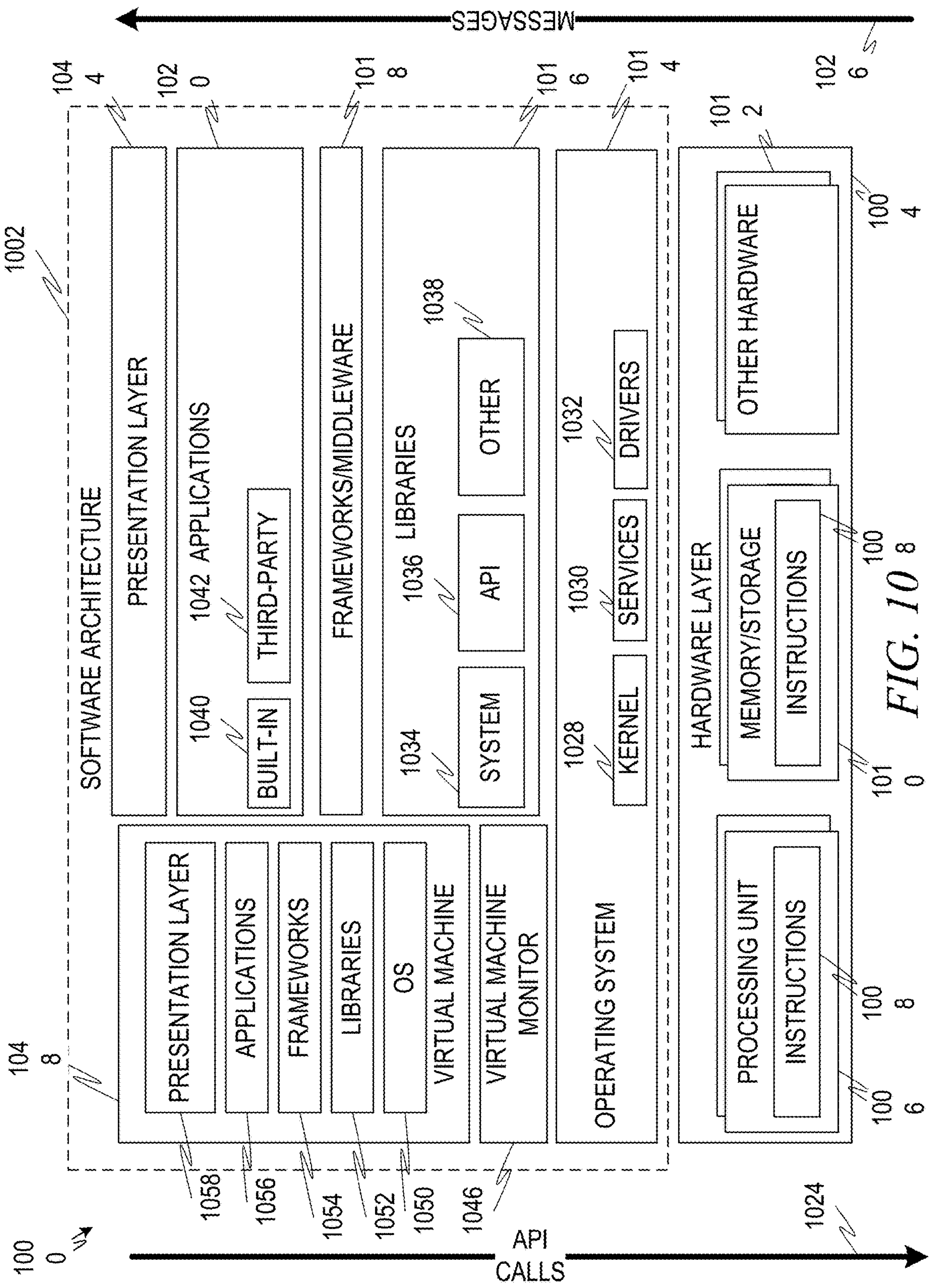
FIG. 10 shows a block diagram showing one example of a software architecture for a computing device.

FIG. 10 shows a block diagram 1000 showing one example of a software architecture 1002 for a computing device. The software architecture 1002 may be used in conjunction with various hardware architectures, for example, as described herein. FIG. 10 is merely a non-limiting example of a software architecture, and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system of FIG. 10.

The representative hardware layer 1004 comprises one or more processing units 1006 having associated executable instructions 1008. Executable instructions 1008 represent the executable instructions of the software architecture 1002, including implementation of the methods, modules, subsystems, and components, and so forth described herein and may also include memory and/or storage modules 1010, which also have executable instructions 1008. Hardware layer 1004 may also comprise other hardware as indicated by other hardware 1012 which represents any other hardware of the hardware layer 1004, such as the other hardware illustrated as part of the software architecture 1002.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and presentation layer 1044. Operationally, the applications 1020 and/or other components within the layers may invoke application programming interface (API) calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the software architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks/middleware 1018 may provide a higher-level common infrastructure that may be utilized by the applications 1020 and/or other software components/modules. For example, the frameworks/middleware 1018 may provide various graphic UI (GUI) functions, high-level resource management, high-level location services, and so forth. The frameworks/middleware 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. Third-party applications 1042 may include any of the built-in applications as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1042 may invoke the API calls 1024 provided by the mobile operating system such as operating system 1014 to facilitate functionality described herein.

The applications 1020 may utilize built-in operating system functions (e.g., kernel 1028, services 1030 and/or drivers 1032), libraries (e.g., system libraries 1034, API libraries 1036, and other libraries 1038), and frameworks/middleware 1018 to create UIs to interact with users of the system. Alternatively, or additionally, in some systems, interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine is hosted by a host operating system (operating system 1014) and typically, although not always, has a virtual machine monitor 1046, which manages the operation of the virtual machine 1048 as well as the interface with the host operating system (i.e., operating system 1014). A software architecture executes within the virtual machine 1048 such as an operating system 1050, libraries 1052, frameworks/middleware 1054, applications 1056 and/or presentation layer 1058. These layers of software architecture executing within the virtual machine 1048 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array [FPGA] or an application-specific integrated circuit [ASIC]) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 11:
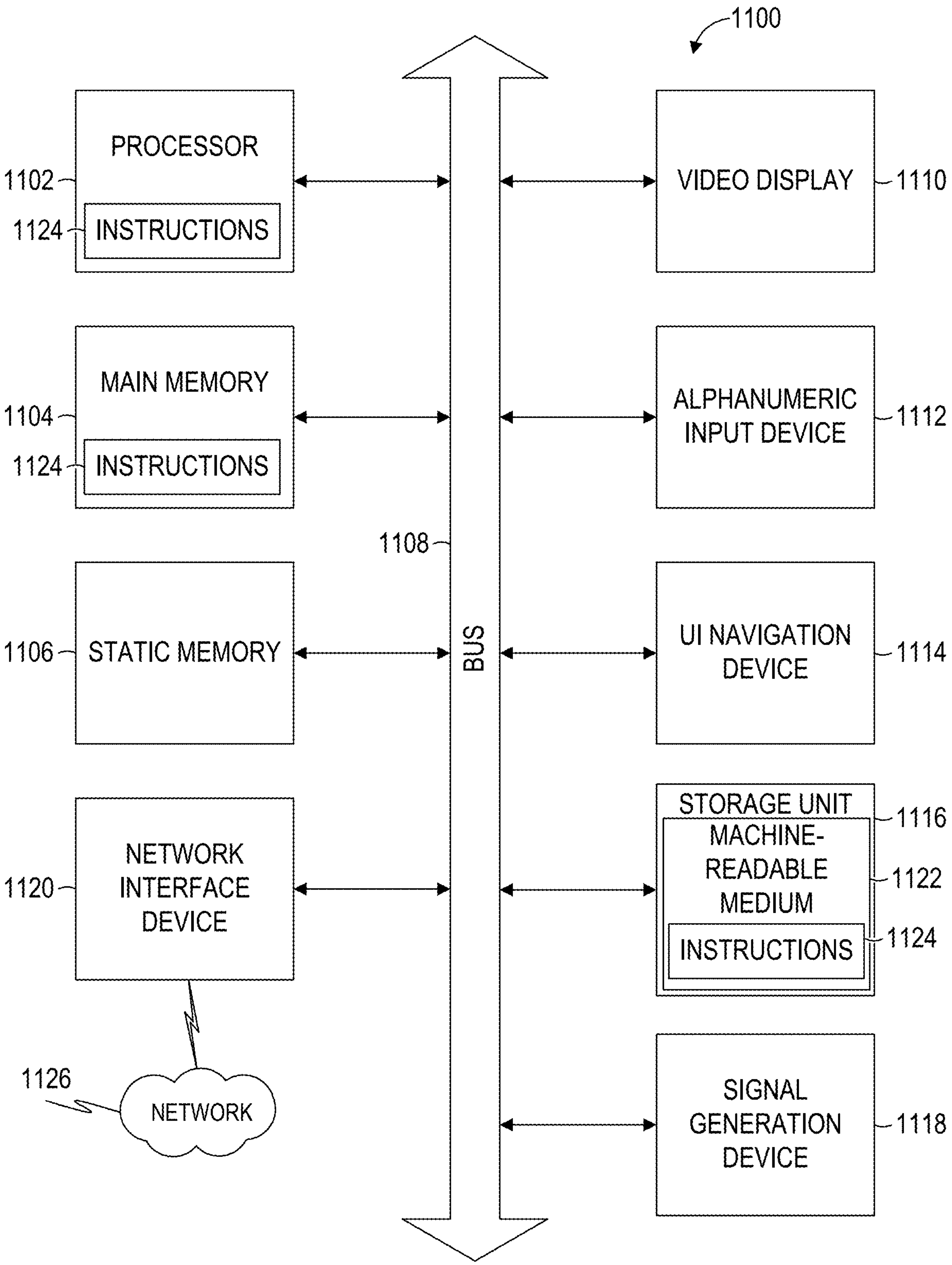
FIG. 11 shows a block diagram of a machine in the example form of a computer system within which instructions may be executed for causing the machine to perform any one or more of the methodologies discussed herein.

FIG. 11 shows a block diagram of a machine in the example form of a computer system 1100 within which instructions 1124 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a UI navigation (or cursor control) device 1114 (e.g., a mouse), a storage unit 1116, a signal generation device 1118 (e.g., a speaker), and a network interface device 1120.

Machine-Readable Medium

The storage unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting a machine-readable medium 1122.

While the machine-readable medium 1122 is shown in FIG. 11 to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with the instructions 1124. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1124 may further be transmitted or received over a communications network 1126 using a transmission medium. The instructions 1124 may be transmitted using the network interface device 1120 and any one of a number of well-known transfer protocols (e.g., hypertext transport protocol [HTTP]). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system for generating unit code tests, the system comprising:

a memory that stores instructions; and one or more processors coupled to the memory and configured to execute the instructions to perform operations comprising:

determining, for a source code file, a plurality of dependencies, each dependency being a file on which the source code file depends;

generating a string comprising contents of the source code file and contents of the plurality of dependencies;

determining a plurality of methods defined by the source code file;

generating a first message that comprises a first context setting portion, the generated string, and a first prompt;

receiving, from a large language model (LLM) in response to the first message, a list of test cases to cover the plurality of methods; and for each method of the plurality of methods:

generating a second message that comprises a second context setting portion, the generated string, the list of test cases, and a second prompt; and receiving, from the LLM in response to the second message, a unit code test for the method.

2. The system of claim 1, wherein the first context setting portion identifies a programming language of the source code file.

3. The system of claim 1, wherein the second prompt identifies the method.

4. The system of claim 1, wherein the second prompt is determined based on a programming language of the source code file.

5. The system of claim 1, wherein the second prompt is determined based on whether the method is a user interface (UI) method or a backend method.

6. The system of claim 1, wherein the determining, for the source code file, the plurality of dependencies comprises:

removing all newline characters from the source code file;

generating a file list comprising all files imported into the source code file; and for each file in the file list, if the file is accessible, adding the file to the plurality of dependencies.

7. The system of claim 1, wherein the operations further comprise:

determining an updated plurality of dependencies for a modified version of the source code file that includes a code portion that was not included in the source code file when it was used to generate the unit code tests;

generating a second string comprising contents of the modified version of the source code file and contents of the updated plurality of dependencies;

generating a third message that comprises a third context setting portion, the second string, the unit code tests generated for the methods of the source code file, the code portion, and a third prompt; and receiving, from the LLM in response to the third message, unit code tests for one or more methods in the code portion.

8. The system of claim 1, wherein the operations further comprise:

receiving, via a user interface, information for a project, the information comprising a project name, a project scope, a persona, and a user story;

based on the project name, the project scope, the persona, and the user story, generating a third message that comprises a third context setting portion and a third prompt; and receiving, from the LLM in response to the third message, source code to implement the project.

9. A non-transitory computer-readable medium that stores instructions that, when executed by one or more processors, cause the one or more processors to perform operations comprising:

determining, for a source code file, a plurality of dependencies, each dependency being a file on which the source code file depends;

generating a string comprising contents of the source code file and contents of the plurality of dependencies;

determining a plurality of methods defined by the source code file;

generating a first message that comprises a first context setting portion, the generated string, and a first prompt;

receiving, from a large language model (LLM) in response to the first message, a list of test cases to cover the plurality of methods; and for each method of the plurality of methods:

generating a second message that comprises a second context setting portion, the generated string, the list of test cases, and a second prompt; and receiving, from the LLM in response to the second message, a unit code test for the method.

10. The non-transitory computer-readable medium of claim 9, wherein the first context setting portion identifies a programming language of the source code file.

11. The non-transitory computer-readable medium of claim 9, wherein the second prompt identifies the method.

12. The non-transitory computer-readable medium of claim 9, wherein the second prompt is determined based on a programming language of the source code file.

13. The non-transitory computer-readable medium of claim 9, wherein the second prompt is determined based on whether the method is a user interface (UI) method or a backend method.

14. The non-transitory computer-readable medium of claim 9, wherein the determining, for the source code file, the plurality of dependencies comprises:

removing all newline characters from the source code file;

generating a file list comprising all files imported into the source code file; and for each file in the file list, if the file is accessible, add the file to the plurality of dependencies.

15. The non-transitory computer-readable medium of claim 9, wherein the operations further comprise:

determining an updated plurality of dependencies for a modified version of the source code file that includes a code portion that was not included in the source code file when it was used to generate the unit code tests;

generating a second string comprising contents of the modified version of the source code file and contents of the updated plurality of dependencies;

generating a third message that comprises a third context setting portion, the second string, the unit code tests generated for the methods of the source code file, the code portion, and a third prompt; and receiving, from the LLM in response to the third message, unit code tests for one or more methods in the code portion.

16. The non-transitory computer-readable medium of claim 9, wherein the operations further comprise:

receiving, via a user interface, information for a project, the information comprising a project name, a project scope, a persona, and a user story;

based on the project name, the project scope, the persona, and the user story, generating a third message that comprises a third context setting portion and a third prompt; and receiving, from the LLM in response to the third message, source code to implement the project.

17. A method comprising:

determining, for a source code file, a plurality of dependencies, each dependency being a file on which the source code file depends;

generating, by one or more processors, a string comprising contents of the source code file and contents of the plurality of dependencies;

determining a plurality of methods defined by the source code file;

generating a first message that comprises a first context setting portion, the generated string, and a first prompt;

receiving, from a large language model (LLM) in response to the first message, a list of test cases to cover the plurality of methods; and for each method of the plurality of methods:

generating a second message that comprises a second context setting portion, the generated string, the list of test cases, and a second prompt; and receiving, from the LLM in response to the second message, a unit code test for the method.

18. The method of claim 17, wherein the first context setting portion identifies a programming language of the source code file.

19. The method of claim 17, wherein the second prompt identifies the method.

20. The method of claim 17, wherein the second prompt is determined based on a programming language of the source code file.

* * * * *